United States Patent [19]
Salem et al.

[11] Patent Number: 5,403,492
[45] Date of Patent: * Apr. 4, 1995

[54] ION EXCHANGE RESIN HAVING DUAL MORPHOLOGY

[75] Inventors: Eli Salem, Deal; Robert Kunin, Trenton, both of N.J.

[73] Assignee: The Graver Company, Union, N.J.

[*] Notice: The portion of the term of this patent subsequent to Mar. 9, 2010 has been disclaimed.

[21] Appl. No.: 115,219

[22] Filed: Sep. 1, 1993

Related U.S. Application Data

[63] Continuation of Ser. No. 2,995, Jan. 11, 1993, which is a continuation-in-part of Ser. No. 824,998, Jan. 24, 1992, Pat. No. 5,192,446.

[51] Int. Cl.$^6$ .............................................. C02F 1/42
[52] U.S. Cl. .................................. 210/683; 210/685; 210/686; 210/692; 210/777
[58] Field of Search ............... 210/668, 679, 683, 685, 210/686, 688, 777, 692

[56] References Cited

U.S. PATENT DOCUMENTS

| | | | |
|---|---|---|---|
| 2,597,438 | 5/1952 | Bodamer | 260/79.3 |
| 3,637,535 | 1/1972 | Corte et al. | 260/2.1 |
| 4,256,840 | 3/1981 | Meitzner et al. | 521/33 |
| 4,973,607 | 11/1990 | Stahlbush et al. | 521/28 |
| 4,975,201 | 12/1990 | Ma | 210/686 |
| 5,192,446 | 3/1993 | Salem et al. | 210/685 |
| 5,248,435 | 9/1993 | Morita et al. | 210/681 |

OTHER PUBLICATIONS

R. Kunin, "Ion Exchange Resins,", pp. 46–47, 98–99 (1958).
Liu et al., "Hope Creek Deep Bed Filtration Pilot Testing,", Paper Delivered at Electric Power Research Institute Conference, pp. 6–7 (Sep. 1991).
T. Izumi et al., "Crud Removal Characteristics of Newly Developed Ion Exchange Resins," 52nd Annual Meeting of International Water Conference, Paper No. IWC-91-57 (Oct. 1991).
R. Kunin, "Two Decades of Macroreticular Ion Exchange Resins," Published Article Appearing in Amber-Hi-Lites Issue 161, Spring, 1979.
T. Izumi et al., "Crud Removal Characteristics of Newly Developed Ion Exchange Resins," 50th Anniversary Meeting International Water Conference, Paper No. IWC-89-52 (Oct. 1989).
I. Inami et al., "Mechanism of Crud Removal By Deep Bed Resins," 50th Anniversary Meeting of International Water Conference, Paper No. IWC-89-51 (Oct. 1989).
R. Bijeo, "Dowex ® Resins–BWR Condensate Polishing," Paper Delivered at Electric Power Research Institute Conference (Jan. 1991).
Sales Literature, "Dowex Marathon C Cation Resin," Believed to Have Been Distributed by the Dow Chemical Company, Circa 1991.
Sales Literature "Diaion ® Manual of Ion Exchange Resins" Believed Distributed by The Mitsubishi Kasei Corporation, Circa 1991, vol. 1, pp. 108–110 and vol. II, pp. 101 and 104.

*Primary Examiner*—Ivars Cintins
*Attorney, Agent, or Firm*—Dressler, Goldsmith, Shore & Milnamow, Ltd.

[57] ABSTRACT

The invention provides a method for removing metal oxides and colloidal material from high-resistivity water streams at a relatively high removal efficiency. The method includes hydrating a highly ionized dual morphology ion exchange resin in a macroreticular, desiccated morphology to produce a macroreticular, hydrated morphology. A water stream which is brought into contact with the resin is purified. The water stream may, optionally, also be contacted with both a cation exchange resin and an anion exchange resin.

The invention additionally provides a method for selecting ion exchange resins which are particularly suited for use in removing metal oxides from a condensate stream. The method serves to narrow the field of candidates for pilot-scale resin testing with industrial water streams.

34 Claims, 8 Drawing Sheets

ION EXCHANGE RESIN HAVING DUAL MORPHOLOGY

This is a continuation of application Ser. No. 08/002,995, filed Jan 11, 1993, which is a continuation-in-part of application Ser. No. 824,998, filed Jan. 24, 1992, now U.S. Pat. No. 5,192,446, issued Mar. 9, 1993, the disclosure of such application and such patent are incorporated herein by reference.

TECHNICAL FIELD

The invention relates to the production of very pure water, and to the removal of impurities which are present in water at relatively low concentrations. More particularly, the invention relates to removal of metal oxides, including oxides of aluminum, silicon, and zinc from high-resistivity water in an ion exchange processing unit. The invention also pertains to the selection of cation and anion exchange resins for removing metal oxides from water.

BACKGROUND OF THE INVENTION

Cation exchange resins and anion exchange resins are widely used for removing ionic species and particulates from water streams. A typical cation exchange resin includes a copolymer, such as a styrene-divinylbenzene copolymer, to which sulfonic acid anionic sites have been attached by a sulfonation reaction. A typical anion exchange resin includes a co-polymer to which ammonium salt cationic sites have been attached.

Useful cation exchange and anion exchange resins contain essentially no leachable compounds, organic or inorganic, that might leave the resin and contaminate the water stream. Additionally, the cation and anion exchange resins must possess sufficient hydraulic stability to resist compressive forces exerted by a flowing stream of water and substantially maintain their shape.

In order to provide such useful ion exchange resins, resin designers have adjusted hydration, swelling, and porosity of ion exchange resins through proper choice of polymers and copolymers and through control of the degree of cross-linking of polymer chains. Additionally, resins having pores with dimensions significantly larger than the molecular distance between adjacent copolymer chains (macroporous resins) have been synthesized. Such resins are referred to as macroporous resins, also called macroreticular resins. The terms macroporous and macroreticular are synonymous, as are the terms microporous and microreticular. Microreticular resins are also called gelular resins.

Macroporous resins have been synthesized by the inclusion of various uncross-linked polymers in a monomer mixture. The included polymers are rendered soluble and leachable following sulfonation or amination. The leachable polymers are removed, leaving relatively large-sized pores throughout the cation exchange resin or the anion exchange resin. Other macroporous resins have been synthesized by polymerizing a resin in a solvent which dissolves monomer reagents but exerts essentially no solvent action on the copolymer produced.

Cation exchange resins and anion exchange resins have been used to purify many different types of water streams, ranging from household drinking water to industrial waste. With the development of modern high-pressure steam generation systems, cation exchange resins and anion exchange resins are currently employed to treat boiler feedwater makeup streams and recycle condensate water streams. Condensate polishing units containing cation exchange resins and anion exchange resins are used to remove impurities, such as iron oxide corrosion products, alumina, and silica from condensate streams produced in chemical manufacturing processes and in electrical power generating plants, both fossil-fueled and nuclear-powered. Similarly, cation exchange resins and anion exchange resins are used to produce ultrapure water streams required in the electronics industry, for example, for producing semi-conductors.

Condensate polishing units containing cation exchange resins and anion exchange resins are the norm for modern steam generation systems operating in the range of about 900 to about 3500 psig. The use of condensate polishing units leads to improved turbine efficiency, shorter unit startup time, protection from the effects of condenser leakage, reduced radiation exposure to personnel, and longer intervals between acid cleanings. The ion exchange resins may be present in relatively deep beds or in coatings on filters.

The use of cation exchange resins and anion exchange resins to purify condensate streams in boiling water reactor (BWR) nuclear reactors is illustrative. In a BWR system, water having a pH of about 7 is circulated through a nuclear reactor core producing saturated steam which is directed to a steam turbine generator and, thereafter, passed to a condensate polishing unit. A small amount of the steam may be converted to radioactive tritium, but in many cases the steam itself is not a significant source of radioactivity. However, impurities in the steam, such as iron oxide and copper oxide particulate, are more readily converted to radioactive isotopes. Additionally, water which has been used to submerge radioactive fuel elements during storage and, subsequently, contains some radioactive particles (i.e. "low level rad waste") may be mixed into the condensate stream for clean-up.

As in fossil-fired power plants, improved turbine efficiency and protection from an accumulation of deposits in the steam systems of nuclear plants are important considerations. Consequently, ion exchange resins are employed in condensate polishing units to remove metal oxide particles which are often present in BWR condensate in the range of about several parts per billion by weight. Cation exchange resins have been developed specifically for this application. These cation exchange resins remove the insoluble iron and copper oxides by means of adsorption and filtration. In similar fashion impurities such as silica are removed from nuclear plant condensate streams by anion exchange resins.

More recently, it has been noted that some of the ion exchange resins used for purifying nuclear BWR condensate streams demonstrate better iron removal efficiency after several months of service. Experts theorize that a fraction of the divinylbenzene linkages, which cross-link styrene polymer chains in the resins, yield to oxidative attack during service. The resins with a reduced degree of cross-linking appear to remove iron from condensate more efficiently. Accordingly, cation exchange resins were developed which contain a relatively low degree of divinylbenzene cross-linking between styrene polymer chains. The cation exchange resins with relatively low degree of cross-linking have been tested in at least one condensate polishing unit serving a nuclear BWR reactor and increased iron removal efficiency has been reported. Similarly, anion exchange resins which had been in condensate polishing service for a significant period of time are reported to exhibit improved friability and rinsing characteristics.

However, the testing of new cation and anion exchange resins on a relatively large pilot plant scale is both expensive and time-consuming. Many types of conventional ion exchange resins are available to steam system operators for removing iron oxides and silica from condensates. From the myriad of products available, steam system operators attempt to select ion exchange resins that can be used to safeguard and improve steam system performance.

Unfortunately, few guide lines exist for selecting an ion exchange resin capable of removing oxides to the very low levels required for boiler feed water in high-pressure steam systems. Selecting a resin by trial and error is a task of elephantine proportions, since there are no known methods for performing such studies in the laboratory. Further, there are no known methods for preparing simulated condensates containing oxides, such as iron oxides, silica, alumina, and zinc oxides, having the correct chemical and physical properties for bench-scale laboratory testing. At the current state of the art, tests must be conducted on a relatively large pilot plant scale, usually on the site of an industrial operation.

Although conventional ion exchange resins have proven useful for condensate polishing in the past, a need exists for an anion exchange resin having an enhanced capacity for those oxides which are substantially insoluble in water at neutral and acidic conditions. Such suspended or colloidal oxides are not efficiently removed by cation exchange resins. A desirable anion exchange resin would demonstrate removal efficiencies of 90% or more and produce a product stream that contained only a few parts per billion by weight of silica and alumina, in conformance with limits set by the nuclear power generation industry. Such an anion exchange resin would adsorb as much of the acid-insoluble oxides as possible. Also, the rate of diffusion of dissociated anions into the resin structure would be high.

SUMMARY OF THE INVENTION

The present invention provides a method for removing metal oxide contaminants and colloidal contaminants, such as silica and organic acids, from a high-resistivity water stream, such as a condensate stream, with improved removal efficiency. The method utilizes an ion exchange resin in which rates of adsorption, dissolution, and diffusion of metal oxide impurities have been coordinated to produce a relatively high overall rate of metal oxide removal.

Additionally, the invention provides a method of selecting ion exchange resins which are particularly suitable for use in purifying condensate streams and other relatively pure, high-resistivity water streams. The method does not require large-scale pilot plant testing on industrial condensate streams.

In one aspect, the invention is a method for removing metal oxides, such as the oxides of iron, copper, aluminum and zinc from a relatively high-resistivity aqueous stream. The method also removes colloidal silica and organic carbon compounds from the aqueous stream, if they are present. The method includes hydrating a highly ionized, dual morphology cation exchange resin which is in a microreticular, desiccated morphology. A change which occurs simultaneously with hydration converts the dual morphology cation exchange resin to a macroreticular, hydrated morphology.

An aqueous stream is passed into a separation zone that includes a particulate bed. The particulate bed is composed of the dual morphology cation exchange resin. The aqueous stream is contacted with the cation exchange resin, while it is in a non-salt form. The cation exchange resin contains exchangeable counter-ions, which are composed substantially of hydrogen ions when the resin is in the non-salt form. A first concentration of the metal oxide or contaminant in the aqueous stream is reduced by contact with the resin.

The method may optionally include contacting the aqueous stream with another highly ionized ion exchange resin. An anion exchange resin may be present as a constituent of the first particulate bed or, alternatively, may be present as a second particulate bed. The anion exchange resin is preferably a dual morphology exchange resin.

In another form, the invention is a method for selecting an ion exchange resin that is especially suitable for removing an unwanted contaminant from condensate. In order to select such a resin, particles of a highly ionized ion exchange resin which is being considered as a candidate for industrial use are provided for testing. It is determined whether the particles are opaque, translucent, or transparent while they are in a dry state. It is also determined whether the particles are opaque, translucent, or transparent while in a hydrated state. Particles which are translucent or transparent in the dry state and opaque in the hydrated state are selected for use in removing the contaminant from condensate. Visual examination of the particles by the naked eye or by microscope, is usually sufficient to determine whether the particles are opaque, translucent or transparent. It is preferred that the determination be accomplished while the resin is in a hydrogen form or a hydroxide form, i.e. a non-salt form.

The physico-chemical structure of the unique ion exchange resins may be defined by a combination of total moisture holding capacity and surface area. For the purpose of this invention, the limits consistent with the unique products having the enhanced capacity for metal oxides and colloidal material are as follows:

Total Moisture Holding Capacity, % wt.—45 to 65%
Surface Area, $m^2/g$—7 to 60

The present invention also provides a method of removing a metal oxide from condensate. The amorphous metal oxide, present as a suspended particulate, or as a colloid, is adsorbed on a highly ionized ion exchange resin. The resin has a resin matrix composed of polymer chains and copolymer cross-linkages which is surrounded by an adsorbent surface. Amorphous and microcrystalline metal oxide adsorbs on the adsorbent surface and dissociates into ionic species at the surface of the resin. These soluble ionic species diffuse into the resin matrix, thus becoming effectively isolated and removed from the condensate stream. The resin is gelular or microreticular in a dry state and substantially macroreticular in a hydrated state and may be present in a powdered form or in a bead form. The resin may be disposed as a layer on an upstream side of a filter or as a deep bed.

DETAILED DESCRIPTION OF THE PREFERRED EMBODIMENTS

Figure 1:
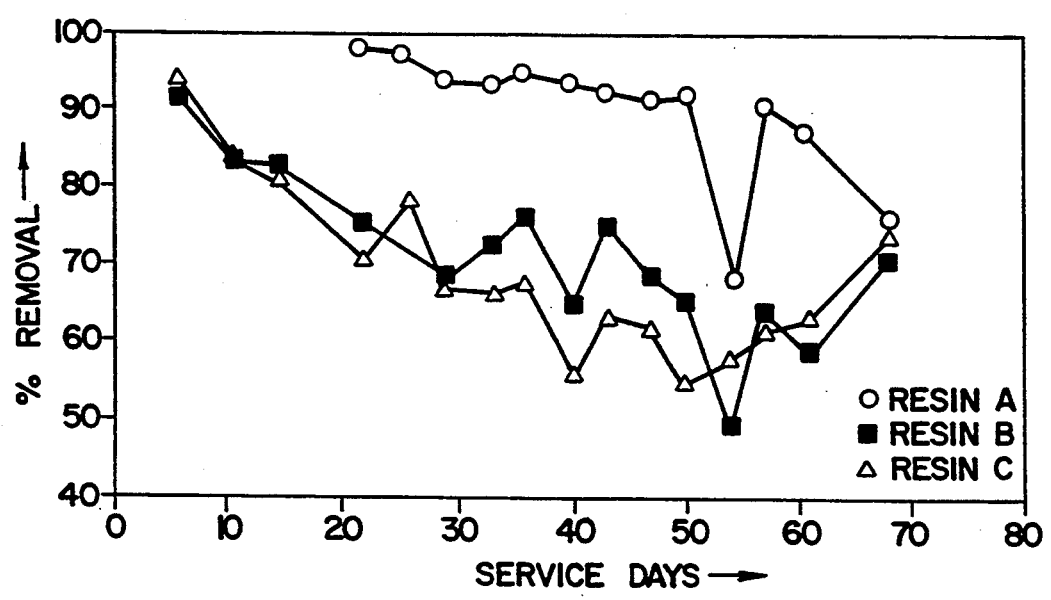
FIG. 1 is a graph illustrating the iron particulate removal efficiency exhibited by three different ion exchange resins as a function of pilot plant days in service.

The invention provides methods for treating relatively pure water to produce extremely pure water suitable for applications such as the manufacture of high-grade electronic components, including transistors and computer chips. The water produced may be utilized as boiler feed water in steam generators, both fossil-fueled and nuclear powered. Also, the invention provides methods for recovering materials from a water stream which are present in minute amounts. For example, the invention can separate radioactive particles from "low-level rad waste streams" which have been utilized to submerge radioactive fuel elements during storage. All of these applications, as well as others which will become apparent to the ordinary practitioner who studies this description, will be referred to as removing contaminants from a high-resistivity water stream. The contaminants can be dissolved in the stream, or suspended, for example, as colloids.

As used herein, the term high-resistivity water stream is intended to mean a fluid stream composed substantially of water exhibiting an electrical conductivity of no more than about 1 microsiemens per centimeter at 25° C. Preferably, the high-resistivity stream has an electrical conductivity in the range of about 1 to about 0.05 microsiemens per cubic centimeter. The methods of the present invention are effective to purify water of lesser purity, as well. However, the further purification of water streams which contain a relatively small concentration of impurities, such as high-resistivity water streams, is especially difficult. Accordingly, it is for these high-technology applications that the present methods are primarily intended. In this sense, purification not only involves the maintenance or improvement of the electrical conductivity, ensuring relatively high specific resistance, but includes removal of minute quantities of suspended matter and also includes removal of organic substances which cannot be measured electrically.

A preferred application for the present invention is the removal of minute quantities of suspended or, alternatively, colloidal radioactive material from an aqueous stream. The source of the radioactive material may be the fuel pit of a nuclear power plant. For example, water which has been utilized to submerge and shield radioactive fuel elements may become contaminated with small bits of radioactive metal. Also, water which is used to cleanse a spent fuel pit may become contaminated with radioactive particles. These streams, as well as other rad waste streams generated within a nuclear power facility, can be purified and rendered less radioactive by contact with an ion exchange resin in accordance with the present invention.

The modern trend in steam generation systems is toward increasing operating pressures and less blowdown. In steam systems operating in the range of about 900 to about 3500 psig, it becomes prohibitively expensive to replace blowdown with an equal volume of boiler feed water treated to the rigorous standards required for high-pressure boiler operation. Furthermore, above about 3200 psig. the water in the steam system exists in a single supercritical phase. With no liquid phase present, impurities are not concentrated for efficient separation and blowdown. Accordingly, in modern high-pressure steam systems a practice of treating condensate streams, called condensate polishing, is the primary means of removing corrosion products from the steam system.

One type of steam system for which the present invention is intended usually comprises a turbine where energy is extracted from a stream of high-pressure steam, a condenser where steam exiting the turbine is cooled to produce a condensate stream, and condensate pumps which transport the condensate stream for reuse. The condensate stream may be stored temporarily before reuse, and may be augmented with treated boiler feed water makeup to replace water which has been lost by the steam system.

The condensate stream, along with a relatively minor amount of makeup water, as necessary, is contacted with one or more ion exchange resins in a condensate polishing unit. The polishing unit may be a deep bed demineralizer having resin in the form of beads arranged in beds typically from about 36 to about 48 inches in depth. The resin may be utilized in powder form as a layer on the upstream side of a filter element through which the condensate passes. The resin may be discarded after use or regenerated. Regeneration may be accomplished within the condensate polishing unit, or in external regeneration facilities.

After polishing, feed pumps transport the condensate stream through preheaters to a steam generation zone.

In the steam generation zone, energy is added to the condensate stream in the form of heat. The heat may be generated by the combustion of fossil fuel, by nuclear reaction, or as a byproduct of an industrial process.

The steam generation zone usually contains ferrous tubing and often contains copper alloy tubing. It may contain a boiler drum where a liquid phase is separated from a gaseous phase. The steam generation zone may optionally be of a drumless design, especially for operation at supercritical pressures. The steam generation zone may include a chemical or a nuclear reactor. Vaporous or supercritical steam is generated by the addition of heat. The steam leaves the steam generation section and passes to a turbine where energy is extracted.

A form of steam system which is well suited for use with the present invention is a nuclear power plant having a Pressurized Water Reactor (PWR). The PWR steam system is physically divided into two loops, each circulating a separate cooling water stream. A primary cooling water loop removes heat from the nuclear reactor and transmits the heat to a hot side of a steam generator. In a secondary cooling water loop, water is converted to steam in a relatively cool side of the steam generator and used to drive a turbine.

The rate of nuclear reaction is controlled through the positioning of neutron-absorbing control rods and also by adjusting the concentration of boric acid added to the primary cooling water loop. To minimize corrosion in the primary cooling water loop, lithium hydroxide is added in an amount which produces an optimum alkalinity.

In the secondary cooling water loop of the PWR system, hydrazine, ammonia, or an amine (such as morpholine) is added to control the alkalinity at a value in the range of about 9.0 to about 9.6 pH. To further retard corrosion of the steam generator tubes, an ion exchange unit is employed to polish the condensate returning from the turbine. Typical water quality control objective maximums to the steam generator of the PWR steam system are 0.002 ppb sodium and 0.05 ppb chloride.

Throughout virtually all steam systems, water is in contact with tubes, vessel walls, or valves made of ferrous or cuprous alloys. Some corrosion of the alloys is inevitable, even when the most meticulous operating procedures are employed. If the products of such corrosion were allowed to remain within the steam system, serious damage would result. For example, iron-containing corrosion products are known to form a deposit on the inside of tubes in high heat transfer areas, causing boiler tube failures. The acid cleaning procedure necessary to remove such deposits is expensive and time-consuming. Similarly, iron-containing corrosion products and silica tend to accumulate on turbine blades, where they can cause significant losses in turbine efficiency, imbalance of the turbine blades, and eventual shutdown of the turbine.

To avoid deposition and accumulation of iron-containing deposits, iron levels in the boiler feed water of high-pressure steam systems must be kept extremely low. Typical recommended limits for iron in boiler feed water expressed as parts per billion by weight (ppb) are a maximum of 50 ppb for steam systems operating at 600 psig. or more, and a maximum of 10 ppb for systems at 1000 psig. or more. Current specifications for BWR systems are 2 ppb (maximum).

The most common iron-containing corrosion products are iron oxides. The iron oxides include $Fe_2O_3$, $Fe_3O_4$, and $FeOOH$. They may be present in either crystalline or amorphous form. The major crystalline types encountered in boiler feed water are $Fe_3O_4$, $\alpha$-$Fe_2O_3$, $\alpha$-$FeOOH$, and gamma-$FeOOH$. The iron-containing corrosion products generally dissociate when the water suspending them is acidified to a sufficiently low pH. However, many high-pressure boilers are controlled at a pH of 8.5 or more, and the corrosion products are present primarily as solid particles. The iron compounds are often present as colloidal particles.

Colloidal particles, such as minute silica, organic carbon, and metal oxide particles in an aqueous medium, can carry positive or negative electrical surface charges. Alternatively, the surfaces of the colloidal particles can be electrically neutral. The surface charge of colloidal particles of a substance in an aqueous medium is usually determined by the acidity or alkalinity of the aqueous medium, relative to an iso-electric point that is fixed for the given substance. In acidic medium, the surfaces tend to carry positive charges. In relatively alkaline aqueous media, the colloidal particles tend to have negatively charged surfaces. At the iso-electric point, the surfaces of colloidal particles are electrically neutral. For example, iron oxide particles in water typically carry negative surface charges when surrounded by an aqueous medium having an alkalinity of about 8.0 pH or greater.

In addition to the iron-containing corrosion products, other contaminants are found in boiler feed water. Even in well maintained supercritical boilers, silica and oxygen are present in the range of several parts per billion. Additionally, many steam systems contain hydrazine, ammonia, or amines which have been added to maintain the boiler feed water in an alkaline range. Copper, zinc, silica, chloride, sulfates and organic compounds including sulfonic acids may also be present. Each of these contaminants is present either as dissociated ions or as solid particles, depending on the properties of the contaminant and the condition of the surrounding aqueous medium. Additionally, any colloidal particles of the contaminants which are present tend to carry surface charges governed by the relationship of their iso-electric points to the acidity or alkalinity of the aqueous medium.

There are several reasons why the most suitable resins cannot be identified by laboratory tests of the prior art. First, the sulfonic acid cation exchange resins and the quaternary ammonia anion exchange resins, which are prime candidates for this service, are virtually all of the styrene-divinylbenzene type. Styrene-divinylbenzene resins undergo changes in chemical and physical properties when converted from a dry state to a hydrated state by contact with water. Because the resins are immersed in water during normal operation, the change will necessarily have occurred by the time the resin is brought on-stream in a condensate polishing unit. The most readily apparent of these changes is an increase in volume accompanied by a decrease in apparent bulk density. This change is often described as a swelling of the resin upon contact with water.

While the resin is swelling, other changes also take place. Effective pore diameters often increase as water is absorbed into the resin particles. Specific surface area available for adsorption may also change.

The changes observed upon hydration correlate to some extent with the degree of cross-linking present in a particular resin. Styrene chains are connected, to a greater or lesser degree, by divinylbenzene linkages which are reflected in the physical properties of the resin. However, the degree of cross-linking is not directly measurable. Rather, it usually must be inferred from other properties, such as the equilibrium water content of the resin and the degree of swelling observed upon contact with water. As a result, one who attempts to predict other physical properties from the degree of cross-linking enters a vicious circle.

The degree of cross-linking cannot be calculated from relative proportions of reagents used to prepare the resin, because the reagents are not pure and are rarely completely characterized. Furthermore, the efficiencies of the various cross-linking reactions which occur are unpredictable. Consequently, correlations which predict the performance of condensate polishing resins based on their degree of cross-linking alone are generally unsuccessful.

The accepted methods for measuring specific surface area of a resin can only be performed when the resin is completely dry and maintained in a carefully controlled atmosphere. Dry surface area is not a reliable indicator of condensate polishing performance. Because many gel ion exchange resins lose surface area when they are dried, the usual methods for measuring surface area have comparatively little value for characterizing condensate polishing resins. Condensate polishing performance is intimately tied to the wet surface area of the hydrated ion exchange resin, which cannot be measured directly.

Neither the degree of cross-linking nor the wet surface area of a particular resin can be determined directly. Qualitatively, however, it is believed that the degree of cross-linking for a condensate polishing ion exchange resin should be low while the wet surface area should be maximized. Ordinary gel-type ion exchange resins, which are usually associated with a low degree of cross-linking, generally exhibit desirably high rates of diffusion into the resin matrix. But a more discerning indicator is required than the distinction between gelular and macroreticular resins because most gel-type ion exchange resins possess relatively low surface area and, accordingly, exhibit low rates of adsorption. In short, the traditionally recited characteristics of degree of cross-linking and dry surface area are inadequate to identify the ion exchange resins which are most useful for condensate polishing.

In place of the difficult-to-measure, inexact, and relatively unreliable indicators utilized in the prior art, a property termed "dual morphology" is offered as a superior means of distinguishing ion exchange resins which are particularly suited for use in condensate polishing. A resin is said to exhibit dual morphology when it can be reversibly converted from a dry, gelular morphology to a macroreticular, hydrated morphology by contact with water.

A resin displaying gelular morphology, predominantly contains gel-type pores which are of a molecular nature and are a part of the gel structure. The gel-type pores are less than 30 Å in diameter. In conventional prior art resins, gel-type pores are generally synthesized by a method which did not include the use of an inert, co-solvent. A synonym for gelular is microreticular.

Macroreticular morphology, also called macroporous morphology, contains a significant proportion of extra-gelular pores that are not a part of the gel structure. The pores of resins having macroreticular morphology are generally greater than 30 Å in diameter. The pores are large compared to atomic dimensions of an associated resin matrix which defines the pores.

The invention provides a method for removing transition metal oxides and cationic species, alumina, silica, and carbon compounds from condensate and other high-resistivity water solutions. The transition metals are those elements found in groups 3b, 4b, 5b, 7b, 8, 1b, and 2b of the Periodic Table of the Elements as depicted on the inside back cover of the 51st Edition of the Handbook of Chemistry and Physics, published by The Chemical Rubber Company. The materials of groups 3a, 4a, and 5a, which include alumina, silica, and carbon compounds, can also be removed by the present method. The invention is particularly useful for removing compounds containing the elements having atomic numbers in the range from 21 to 30 and 42, which are commonly employed in ferrous piping systems.

Iron, cobalt, and nickel oxides can be removed using the present invention, whether they are present in suspended, colloidal, or dissolved form. Similarly, crystalline amorphous and dissociated transition metal oxides can be removed from condensate by the present invention. Colloidal silica and organic acids can also be removed. Various aspects of the invention enhance removal of particular contaminants from aqueous media having specific properties. Removal efficiencies of greater than 90% are practical. The invention can produce condensate having less than 50 ppb of total dissolved solids.

One aspect of the invention utilizes a cation exchange resin for removing transition metal oxides. Other soluble cationic species, such as calcium, magnesium, and sodium are also removed by the method if they are present in the condensate. However, there are many cationic exchange resins in the prior art which satisfactorily remove commonly encountered soluble cationic species as, for example, calcium, magnesium and sodium, when present in relatively large quantities. The present invention is primarily intended for further improving the quality of condensate streams from which easily exchanged soluble cationic species have previously been substantially removed.

Similarly, another aspect of the invention utilizes an anion exchange resin which removes anionic species that are insoluble in acidic or approximately neutral aqueous solutions, while being soluble at conditions near the resin surface. This aspect of the invention is presently considered to be useful for removing group 7a materials to extremely low levels of concentration, and also for removing relatively less tractable materials of groups 3a, 4a and 5a.

The present invention can remove organic species that are dissolved or entrained in the condensate stream. Such organic materials may have entered during construction or maintenance of the boiler system, or perhaps through a leaking seal of a boiler feedwater pump. Alternatively, the organic materials may be leachates that have escaped from a cation exchange resin. In many applications, the present invention can reduce the total-organic content of condensate streams to a fraction of a part per million by weight or less.

Yet another aspect of the invention utilizes a strongly acidic dual morphology, cation exchange resin to remove transition metal oxides. The strong acid cation resins, such as sulfonic resins, are about as acidic as hydrochloric acid. In contrast, weak acid cation resins, such as carboxylic resins, are about as weakly acidic as acetic acid. Strong acid cation exchange resins easily split neutral salts, such as sodium chloride, converting them to acids. Weakly acidic cation exchange resins are unable to split neutral salts. Ion exchange resins having fixed ions which are strongly acidic or strongly basic are said to be a highly ionized ion exchange resins.

The cation exchange resin employed in the invention preferably has a dual morphology. By definition, such a resin can be reversibly converted from a microreticular morphology to a macroreticular morphology by contact with water. By contacting the resin in a dry state with water, the dual morphology resin becomes hydrated. Similarly, anion exchange resin having a dual morphology is preferred.

Before any characterization of an ion exchange resin can be performed, the resin should be pretreated. Otherwise, the results obtained may be misleading. In order to pretreat a sample of ion exchange resin preparatory to characterization, the sample is placed in a 2 inch diameter column and backwashed at 100% bed expansion until a clear backwash effluent is observed. The resin bed is then permitted to settle. In the case of sulfonic acid and quaternary ammonium anion exchange resins, the bed is next treated with 5 to 10 volumes of a 10% NaCl solution and then rinsed with deionized water. Weak base resins are regenerated with 3 to 5 volumes of 1.0M NaOH solution and then rinsed with deionized water. Carboxylic resins are treated with 3 to 5 volumes of 1.0M HCl solution and rinsed with deionized water. In each case, the sample is thereafter drained to remove free water. For a more detailed description of the resin pretreatment procedure, see R. Kunin, Ion Exchange Resins, pages 320 to 321 (2nd Edition, 1958).

The moisture content of resins, also called equilibrium water content, is determined after the resin pretreatment procedure has been accomplished. A 1.0 to 5.0 gram sample is weighed and then dried in an oven at 110° to 115° C. overnight. Subsequently, the sample is weighed again. The moisture content is the difference in weights and is expressed as a percentage of the dry weight of the sample.

For the purposes of the present invention, a desiccated morphology is defined as a physical condition in which a resin exists when it contains 5% or less equilibrium water content. A hydrated morphology is defined as a condition in which a resin exists when it contains 95% or more of equilibrium water content. Generally, when a styrene-divinylbenzene resin is dried it shrinks. When placed in water, it swells and its polymer chains and divinylbenzene cross-linkages spread apart and facilitate the diffusion of larger ions. The degree of swelling depends to some extent on the degree of cross-linking. The greater the number of cross-links, the less the moisture holding capacity and the swelling.

The method comprises a hydrating step in which the highly ionized dual morphology ion exchange resin is converted from a microreticular desiccated morphology to a macroreticular hydrated morphology. In most instances, resins are shipped in the hydrated state. However, there are times when the resins are shipped dry or in a less than fully hydrated state. For example, a portion of resin beads packed within a drum containing an aqueous phase may be exposed and become desiccated as contents of the drum shift during shipment. It is contemplated that the hydrating step will be fully completed at the industrial facility where the resin is utilized for purifying condensate. However, the scope of the invention includes hydrating the dual morphology ion exchange resin during a manufacturing process and delivering the resin to a point of industrial use in the macroreticular hydrated morphology.

The invention also comprises passing the condensate containing the unwanted contaminant into a separation zone and contacting the condensate with a first particulate bed. The condensate may be passed as a separate stream or it may be part of an aqueous stream containing water from other sources as well. The aqueous stream may contain, for example, boiler feedwater makeup and condensate from temporary storage, along with condensate passed directly from a condenser in a steam system.

In the aqueous stream, the contaminant is carried as a dissolved solid, a suspended solid, or a colloid. The colloid contains a myriad of colloidal particles, which can be solids or, alternatively, droplets that are immiscible with the surrounding aqueous stream. It is contemplated that the concentration of the contaminant will be in the range of about 0.1 to about 1000 ppb based on the weight of the aqueous stream. Preferably, the concentration of all the metal oxides in the aqueous stream before being purified by the present invention total less than about 500 ppb. It is preferred that the concentration be reduced by about 90% by removing metal oxides through the use of the present method.

Contacting takes place in the separation zone. The separation zone is generally a condensate polishing unit. Optionally, the separation zone may include a prefilter.

Tubular and leaf prefilters are preferred, both of which may be employed with a fiber or other filter aid. The dual morphology ion exchange resin of the present invention may be employed in conjunction with or in place of the filter aid. Suitable filter aid materials include cellulose fibers and also other fibrous materials, for example, synthetic fibers such as nylon fibers and polyester fibers. When present in a powdered form, the first particulate bed is a layer having a thickness in the range of about ⅛ to about ½ of an inch on the upstream side of the prefilter.

Alternatively, the dual morphology, ion exchange resin may be in bead form. In that case, it is preferred that the first particulate bed be in the range of about 24 to 48 inches in depth, preferably 36 inches. Such a "deep bed" is enclosed in a process vessel having inlet distributors and underdrains which provide for a substantially uniform plug flow through the bed with minimal disturbance of the resin particles. The process vessel may optionally be fitted with means to reverse the flow in the process vessel as, for example, during backflushing or chemical regeneration of the resin. Additionally, the process vessel may be fitted with means to transport the resin out of the separation zone for external resin regeneration or cleaning. Of course, the resin may be simply discarded after use or may be reloaded elsewhere for further use in some less demanding process application.

In one aspect of the invention, the first particulate bed is constituted by strongly acidic dual morphology cation exchange resin prepared by the sulfonation of a cross-linked copolymer, preferably a styrene-divinylbenzene copolymer. The active sites of the sulfuric acid cation exchange resin are negatively charged sulfonate groups which are capable of binding and exchanging cations. The active sites are also called fixed ions. The dual morphology cation exchange resin of the present invention is contacted with the aqueous stream while the resin is in the hydrogen form.

The following example will illustrate the meaning of hydrogen form as applied to ion exchange resins. Immobile ion exchange sites of a sulfonated cation exchange resin can include immobile anionic sulfonate radicals as fixed ions. If most of the anionic radicals were attached to mobile sodium cations, called counter-ions, the resin would be in sodium form. Subsequently, a preponderance of the sodium cations might be exchanged for hydrogen ions, thus converting the resin into a hydrogen form. If the counter-ions were exchanged for amine cations the resin would be in amine form. Similarly, an anion exchange resin might be converted from chloride form to hydroxide form by exchanging chloride anions for hydroxide anions. When a substantial portion of the counter-ions are neither hydrogen ions nor hydroxide ions, the resin is said to be in a salt form.

Preferably, converting a dual morphology ion exchange resin from a salt form to the non-salt form is accompanied by a simultaneous swelling of the dual morphology ion exchange resin in the range of from about 5% to about 12% by volume, more preferably in the range of from about 5% to about 10% by volume. Preferably, converting dual morphology anion exchange resin from a chloride to a hydroxide form is accompanied by a simultaneous swelling of the dual morphology anion exchange resin in the range of from about 5% to about 10% by volume.

In a presently contemplated and preferred form of the invention, the dual morphology resin is a cation resin manufactured by the Mitsubishi Kasei Corporation and commercially available under the tradename Diaion TM PK212L. The Diaion TM PK212L resin from Mitsubishi has been experimentally determined to be translucent in a desiccated state and opaque in a hydrated state. Mitsubishi Kasei literature describes the product as a sulfonic acid cation exchange resin with a styrene-divinylbenzene cross-linked matrix having an ultimate ion exchange capacity of about 1.5 to about 1.8 milliequivalents per cubic centimeter in the sodium form.

The Diaion TM PK212L resin is delivered by the manufacturer in sodium form and converted to hydrogen form for use in the present invention. The resin has a shipping density of about 773 grams per liter, a moisture content of about 52 to 58% in sodium form, and an effective diameter of 0.61 mm.

The method for removing transition metal oxides in soluble cationic species may be practiced in a separation zone that contains more than one particulate bed. Each of the beds may contain one or more types of ion exchange resin, for example, a cation exchange resin and an anion exchange resin. The aqueous stream may be contacted with anion exchange resin in a basic form, either before or after the aqueous stream containing condensate is passed to the first particulate bed. The anion exchange resin is a strong base resin, having quaternary ammonium functional groups or modified quaternary ammonium functional groups. The aqueous stream is contacted with the anion exchange resin while it is in a hydroxide form. Preferably, the anion exchange resin is also a dual morphology exchange resin.

The method for removing transition metal oxides is advantageously conducted at predetermined space velocities in which the ratio of a cation exchange resin space velocity to an anion exchange resin space velocity is prepared to coincide with the ratio of removable cations and anions which are expected to enter the condensate polishing unit with the aqueous stream. Ideally, this precaution avoids having one resin become exhausted before the other. Matching the ratio of resin space velocities with the ratio of removable cations to removable ions is especially important for mixed bed operation. The present invention can be utilized with physically separate resin beds and, alternatively, as a mixed bed operation.

It is, therefore, preferred that the ratio of the dual morphology anion exchange resin space velocity to the cation exchange resin space velocity be maintained in the range of about 9:1 to about 1:3. The low end of the range is appropriate when it is anticipated that considerable amounts of sodium chloride may leak into the system and have to be removed. Similarly, additional anion resin serves to avoid premature silica breakthrough.

When powdered resin is applied in the separation section as a filter aid, the ratio of cation resin to anion resin in the precoat may be as high as 9:1 in condensate polishing units where the function of the cation resins is primarily the removal of metals alone. Typically, powdered resin filters are operated at flow rates of about 4 gallons per minute per square foot, with a resin layer approximately one quarter of an inch thick. A typical pressure loss through the filters is about 2 to about 5 psi when the resin is clean and about 25 to about 30 psi when the resin is loaded. Powdered resin, about 90% finer than 325 mesh, is applied on, for example, nylon cartridge, polypropylene cartridge, or other synthetic material cartridge elements. Preferably the powdered resin is constituted by resin particles having a particular size in the range of about 5 to about 300 microns, most preferably about 40 microns to about 250 microns. The precoat materials are not usually regenerated, but simply discarded after use.

The separation zone is preferably operated at a pressure dictated by the pumping system that transfers the condensate from the condenser. The condensate pump discharge pressures may range from about 250 to 600 psi. Alternatively, the condensate polishing unit may be operated at a pressure as low as about 100 psi if a booster pump is provided downstream of the condensate polishing unit. Because high temperatures can damage ion exchange resins, the condensate polishing unit is rarely operated at a temperature of more than about 300° F.

At these pressures and temperatures, the aqueous stream is in a liquid state in the separation zone. The aqueous stream is contacted heterogeneously with a bed of solid bead resin particles. The resin particles have a particle size in the range of about 250 microns to about 1200 microns, as measured by a wet-sieve analysis performed upon the resin particles while they are in a hydrated state.

As a result of the contact between the aqueous stream and the resin particles, a purified stream is produced within the separation zone. The purified stream has a second concentration of the metal oxide, which is reduced in comparison to the first concentration. That is, a metal oxide present in a measurable concentration in the aqueous stream is removed by contact with the strongly acidic dual morphology cation exchange resin. The purified stream so produced may optionally be contacted with a second particulate bed including an exchange resin. The second particulate bed may include two or more types of resins which are arranged to be fluidized concurrently in the same process vessel as a single mixed bed.

Typical of the changes in physical properties which are observed upon hydrating the dual morphology cation exchange resin of the present invention are swelling, a decrease in apparent bulk density, an increase in pore diameter, and an increase in moisture content. Moisture content of the dual morphology cation exchange resin is in the range of about 45% to 65% by weight when fully hydrated.

In a preferred aspect, the invention utilizes a strongly basic dual morphology, anion exchange resin. Preferably the strongly basic anion exchange resin includes a quaternary ammonia salt or, alternatively, a modified quaternary ammonia salt as a fixed ion. This aspect of the invention is particularly suited for use in alkaline aqueous streams, preferably to remove contaminants which are relatively insoluble in neutral or acidic aqueous streams. The aspect also provides a method for removing colloidal contaminant particles which are in an aqueous stream which is more alkaline than the iso-electric point of the colloidal particles. Surprisingly, the dual morphology anion exchange resin adsorbs metal oxide contaminants, silica, alumina, and carbon compounds from an aqueous stream, irrespective of whether the aqueous stream has an alkalinity above or below the iso-electric point of the contaminants. Apparently, it is the local pH at the surface of an ion exchange particle that determines the charge on a contaminant which approaches near the surface.

The surfaces of strongly basic anion exchange resin particles carry a positive electrical charge. Additionally, the surfaces of strongly basic anion exchange resins are relatively high in pH, being buffered to resist the influence of the surrounding aqueous stream. Therefore, a contaminant particle approaching closely to the surface of a highly ionized anion exchange resin enters a localized region of high pH. If the local pH is above the iso-electric point of the contaminant particle, the particle becomes negatively charged. The negatively charged particle is then adsorbed by the positively charged anion exchange resin surface. The amount of resin surface exposed to the contaminant particles directly affects the rate of adsorption.

Once adsorbed upon the surface of the anion exchange resin, the contaminant particle may simply come to rest or, alternatively, become dissociated and diffuse into the interior of the anion exchange particle. For example, the hydrous oxides of aluminum and zinc are dissolved after adsorption on the relatively alkaline surface of the anion exchange resin. Importantly, the anion exchange resin of the present invention can adsorb colloidal silica and, subsequently, dissolve the adsorbed colloidal silica in a manner analogous to that exhibited by the cation exchange resin of the present invention for iron oxides.

Preferably, the highly ionized dual morphology resin of the present invention adsorbs, dissociates, and diffuses an objectionable contaminant at approximately equal rates so that none of the rates lags behind to create a bottleneck, as compared to the others. When the transport rates are balanced, the resin continues to remove the objectionable contaminant for a relatively long period of time. Accordingly, it is preferred that the ion exchange resin be capable of dissociating the objectionable contaminant in the presence of the aqueous stream in which it is encountered.

Some contaminants are known to be substantially insoluble in neutral or acidic aqueous streams. For example, colloidal silica is relatively insoluble under acidic and approximately neutral aqueous conditions. Consequently, colloidal silica is not appreciably removed by cation exchange resins. In contrast, the dual morphology anion exchange resin of the present invention operates to remove silica with a relatively high efficiency from aqueous streams having alkalinity of about 8.0 pH or more.

In a preferred form of the invention, the highly ionized, dual morphology anion exchange resin is a resin manufactured by the Mitsubishi Kasei Corporation that is commercially available under the trade name Diaion TM PA308. The Diaion TM PA308 resin has been experimentally determined to be a dual morphology resin. Mitsubishi Kasei literature describes the product as a Type I strongly basic anion exchange resin with a styrene-divinylbenzene cross-linked matrix having a minimum ion exchange capacity of about 1.0 milliequivalents per cubic centimeter in the chloride form. The resin has a shipping density of approximately 655 grams per liter, a moisture content of about 57 to 67 percent, and an effective diameter of about 0.35 to 0.55 millimeters.

The following examples will serve to illustrate the method of the present invention.

EXAMPLE 1

A pilot plant for evaluating cation resins was designed and assembled on a test skid. It was installed at a nuclear generating station which had been in operation approximately 5 years. Typical iron particulate levels for condensate at the nuclear generating station are in the range of about 20 to about 40 parts per billion by weight.

Approximately 150 feet of 1½ inch carbon steel tubing carried condensate from the discharge side of primary condensate pumps to the pilot plant. Effluent water from the pilot plant was returned by similar piping to the suction side of the primary condensate pumps. Total flow through the pilot plant was about 4.0 gpm. Pilot plant inlet pressure was 145 psi.

The pilot plant contained four 2 inch diameter stainless steel resin test columns. Each of the test columns held 1,850 cubic centimeters of mixed resin in a resin bed having a depth of 3 feet. In addition to instrumentation for measuring flow, water conductivity, and pressure differential across the resin bed, each column contained a Millipore sampler with 0.45 micron membrane paper and Toray cation exchange paper which determined effluent condensate particulate and soluble metal levels. About 50 cubic centimeters per minute of sample flow was passed through the filters, with the filter papers being changed every 3 to 7 days. The filter papers were subsequently dissolved with a microwave digester and analyzed for metals using inductively coupled plasma techniques.

A bypass line with a similar sampler was installed to collect a sample of influent iron from the condensate.

Additionally, samples from the pilot plant inlet and the four resin column outlets were routed to a sequence controller installed on a resin test skid. The controller selected one sample at a time for analysis while routing the other three samples to disposal. The selected sample was analyzed first by an Anatel Model 100SE total organic analyzer, with a detection limit of 0.1 ppb. Then, the selected sample was passed through a General Electric Model 201 single channel ion chromatograph. By this dual analysis technique, inorganic and organic chlorides and sulfates in the condensate were measured at levels as low as 10 ppt.

The pilot plant did not contain provisions for resin cleaning or backwashing. In order to simulate as closely as possible the effects of normal plant operation, a transportable pilot-type ultrasonic resin cleaning system was obtained from Ultra Pure Water Technology. The pilot ultrasonic resin cleaning system sluiced the resin from a test column in the pilot plant, ultrasonically cleaned the resin, and returned it to the test column.

Figure 2:
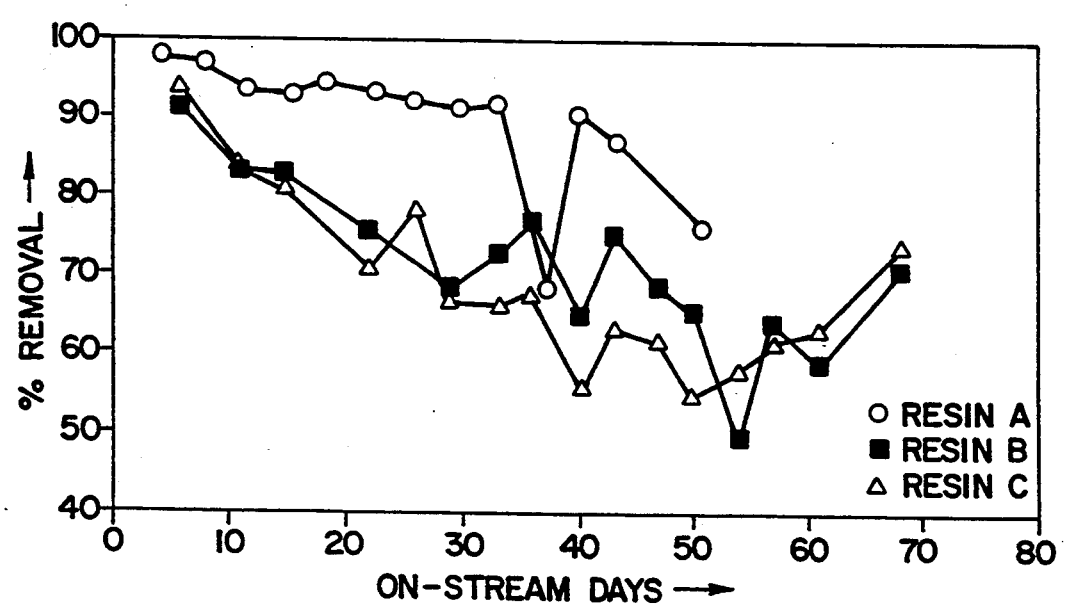
FIG. 2 is a graph showing the removal efficiency of three ion exchange resins as a function of onstream days for each resin.
Figure 3:
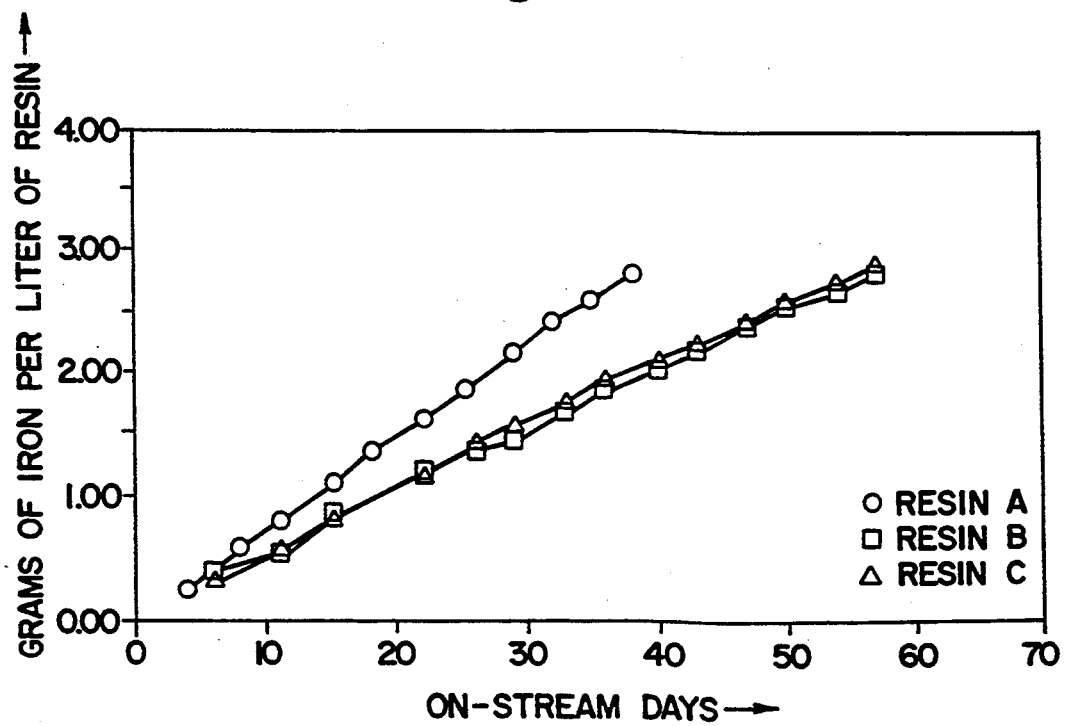
FIG. 3 is a graph depicting the resin loading, expressed in grams of iron per liter of resin, exhibited by three ion exchange resins as a function of onstream days for each resin.

The results of in-plant pilot testing for Resin A, Resin B, and Resin C are presented in FIGS. 1 through 3. Resin A is manufactured by the Mitsubishi Kasei Corporation under the trade name Diaion TM PK212. The Diaion TM ion PK212L resin appeared translucent when dry but opaque when wet, as determined by visual examination. Resin B is manufactured by Rohm & Haas under the trade name IR-120. Resin B appeared translucent when dry and translucent when wet. Resin C is a commercially available resin produced by the Dow Company under the trade name Marathon C. Resin C also appeared translucent when dry and translucent when wet.

FIG. 1 shows the particulate iron removal efficiency of the three resins as a function of service days. Service days are days in which the pilot plant was in service processing condensate. Resin B and Resin C were commissioned together at service day "zero", and their removal efficiencies were first determined at approximately six service days. Resin A was commissioned and began processing condensate at approximately the eighteenth service day, with the first removal efficiency data point for Resin A being reported for the twenty-first service day.

It is important to distinguish service days which measure the time that the pilot plant processed condensate from onstream days which are measured differently for each of the resins. The onstream days represent the period of time during which a particular resin was processing condensate.

Referring now to FIG. 1, Resin B and Resin C initially exhibited removal efficiency of 90% or greater, but by the tenth service day had dropped into the range of about 80% removal. Thereafter, the performance of both Resin B and Resin C continued to deteriorate, falling below 70% removal efficiency by the fiftieth service day.

In contrast, Resin A demonstrated an initial removal efficiency of considerably more than 90% and continued to exhibit removal efficiencies in the range 90% or more through the fiftieth service day.

FIG. 2 presents the removal efficiencies of each resin as a function of the number of days that a particular resin was onstream. Viewed in the perspective of onstream days, it is apparent that Resin A performed at a higher initial iron particulate removal efficiency and demonstrated higher stability throughout its run.

FIG. 3 compares the resin crud loading of the three resins as a function of their onstream days. It can be seen that Resin A collected more iron particulate than did each of the other two resins during the thirty-eight days in which Resin A was onstream.

Taken together, the particulate iron removal efficiency and resin iron loading data demonstrate that Resin A, which is a resin that is translucent in a dry state and opaque in a hydrated state, outperformed Resin B and Resin C as an iron scavenging iron exchange resin for condensate. Particulate iron is not the only type of iron which the resin of the present invention will remove. The resin of the present invention does remove soluble iron species. However, particulate iron is the most damaging form of iron in condensate systems and is relatively susceptible to quantitative analyses. Resin B and Resin C, being translucent in both the desiccated state and the hydrated state, are not ion exchange resins according to the present invention.

EXAMPLE 2

The following prophetic Example describes the predicted performance of two separate mixed bed condensate polishing units operating on portions of a simulated condensate stream, which is designated Run 2 influent. In order to more fully communicate the invention, predicted test results are presented graphically in FIGS. 4 through 9. The graphs in FIGS. 4 through 9 do not represent actual results. Rather, FIGS. 4 through 9 present estimates consistent with hypotheses which are believed to be helpful in understanding and practicing the invention.

The simulated condensate postulated for the Run 2 influent stream is a mixture of ultrapure, high-resistivity water and measured amounts of contaminants calculated to represent the type of condensate normally encountered in the operation of a Boiling Water Reactor. The simulated condensate has a pH of 7.2 to 7.4.

Both of the hypothetical mixed beds contain a conventional, gel-type cation exchange resin in hydrogen form, such as Dowex TM $50 \times 10$ which is manufactured by the Dow Chemical Company. One of the mixed beds, designated Mixed Bed D, also contains a conventional, gel-type anion exchange resin in hydroxide form. Mixed Bed D operates on the Run 2 influent stream and produces an effluent stream which illustrates performance attainable through prior art methods.

The other of the mixed beds, designated Mixed Bed E, contains the conventional, gel-type cation resin as described above. In addition, Mixed Bed E is assumed to contain a dual morphology anion exchange resin in hydroxide form. The assumed dual morphology anion exchange resin in Mixed Bed E is Diaion TM PA308 resin, which is manufactured by Mitsubishi Kasei Corporation of Tokyo, Japan. An effluent stream which exits from Mixed Bed E illustrates the predicted performance of the present invention with condensate streams that are approximately neutral or slightly acidic.

Both Mixed Bed D and Mixed Bed E are precisely three feet in depth. They operate at about 70° F. in upflow mode with a condensate flux of 50 square feet per minute. The volume ratio of cation exchange resin to anion exchange resin for each of the mixed beds is unity.

Figure 4:
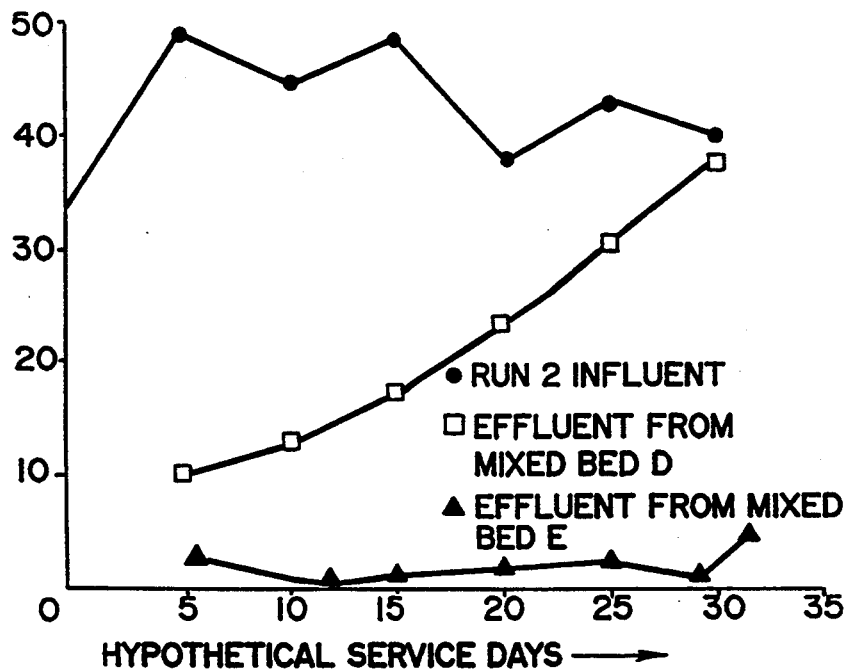
FIG. 4 is a graph which shows predicted test results for the concentrations of metal oxide particulate of a Run 2 influent and two effluent streams as a function of service days.

FIG. 4 depicts predicted test results for the concentrations of metal oxide particulate in the Run 2 influent stream, the effluent stream from Mixed Bed D, and the effluent stream from Mixed Bed E as functions of time. The concentrations presented in FIG. 4 are merely useful fictions, and are not actual test results. The concentrations are expressed in parts per billion by weight of metal oxide particulate, based on the total weight of the associated stream. The metal oxide particulate concentration is hypothetically determined by filtering a stream with a 0.45 micron paper filter and analyzing the residue obtained by well-known inductively coupled plasma techniques.

Time for FIG. 4 is expressed in service days. It can be seen that the concentration of metal oxide particulate in the Run 2 influent stream is not constant, but is imagined as varying between about 35 and about 50 metal oxide particulate ppb as is often observed in commercial boiler operation. It is important to remember that FIG. 4 does not include data from any work actually done.

The effluent stream from Mixed Bed D contains a concentration in the range of about 10 ppb by weight of metal oxide particulate at 5 service days, increasing to almost 40 ppb at 30 service days. This increase is postulated to demonstrate that, at least initially, the mixed bed containing conventional cation exchange resin and the conventional anion exchange resin are expected to adsorb iron oxide particles. However, the metal oxide particulate concentration of the Mixed Bed D effluent stream is expected to increase significantly over time. This hypothetical increase is consistent with a well-known tendency of conventional mixed beds to become saturated with an equilibrium loading of adsorbed metal oxide particulate on the surface of the resin particles. Generally speaking, after the surface loading equilibrium is achieved, very little additional metal oxide particulate removal takes place and the ion exchange resins of such saturated conventional beds are usually relegated to disposal.

In contrast, the metal oxide particulate concentration estimated for the effluent stream from Mixed Bed E is in the range of about 5 ppb by weight at 6 service days, and remains below 10 ppb throughout 31 service days of operation. Because the hydrated dual morphology anion exchange resin included in Mixed Bed E is in macroreticular morphology, it is expected to have a relatively higher surface area than the conventional anion exchange resin assumed to be in Mixed Bed D. Accordingly, the Mixed Bed E has a relatively greater total surface area which presumably exhibits a higher efficiency in adsorbing metal oxide particulate during the early part of the run. Similarly, the relatively greater surface area of the macroreticular dual morphology anion exchange resin should allow Mixed Bed E to continue adsorbing metal oxide particulate for a longer period of time.

Figure 5:
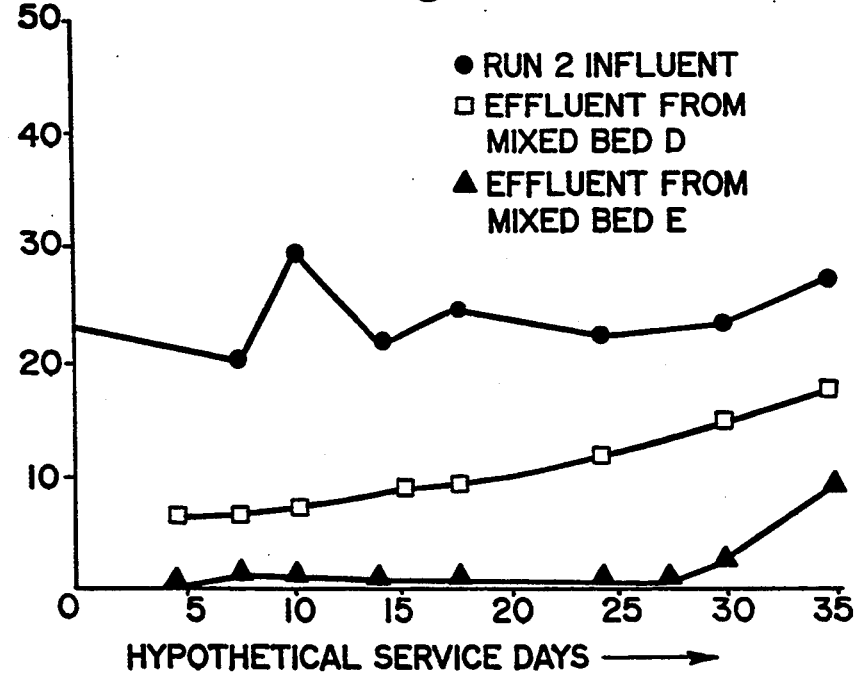
FIG. 5 is a graph which presents predicted test results for the concentrations of insoluble iron of the influent and the two effluent streams of Run 2.

A portion of the metal oxide particulate is expected to be insoluble iron particulate. The concentration of insoluble iron for each of the three streams of Run 2 is shown in FIG. 5 as a function of service days. All of the concentration data shown in FIG. 5 is fictional and should not be confused with actual results. A comparison of FIG. 5 with the hypothetical concentrations of FIG. 4 indicates that the trend of insoluble iron concentration generally follows that of the overall metal oxide particulate concentration. The predicted tendency toward equilibrium loading caused by limited resin surface area and saturation by adsorbed particles at the resin surface, as described above with regard to FIG. 4, is expected to be evident in the data of FIG. 5.

Figure 6:
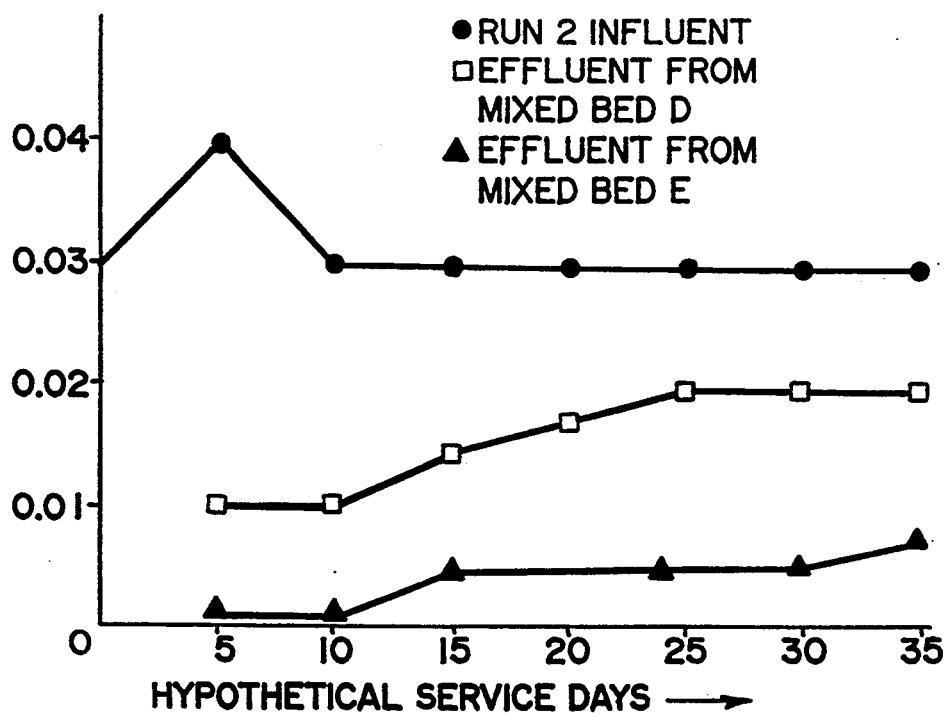
FIG. 6 is a graph which shows predicted test results for the concentrations of insoluble copper in the influent stream and the two effluent streams of Run 2.

Another imaginary portion of the metal oxide particulate is composed of insoluble copper, which gives rise to fictional concentrations graphed as functions of service days in FIG. 6. Both of the mixed beds are assumed to continue to remove insoluble copper throughout Run 2. However, Mixed Bed E, which contains the dual morphology anion exchange resin, is expected to have a relatively greater surface area and to adsorb the insoluble copper more efficiently at all times during Run 2. It is theorized that the Run 2 influent stream does not contain sufficient insoluble copper to saturate either the conventional mixed bed, Mixed Bed D, or the mixed bed of the present invention, Mixed Bed E, within the 35 service days of operation.

Figure 7:
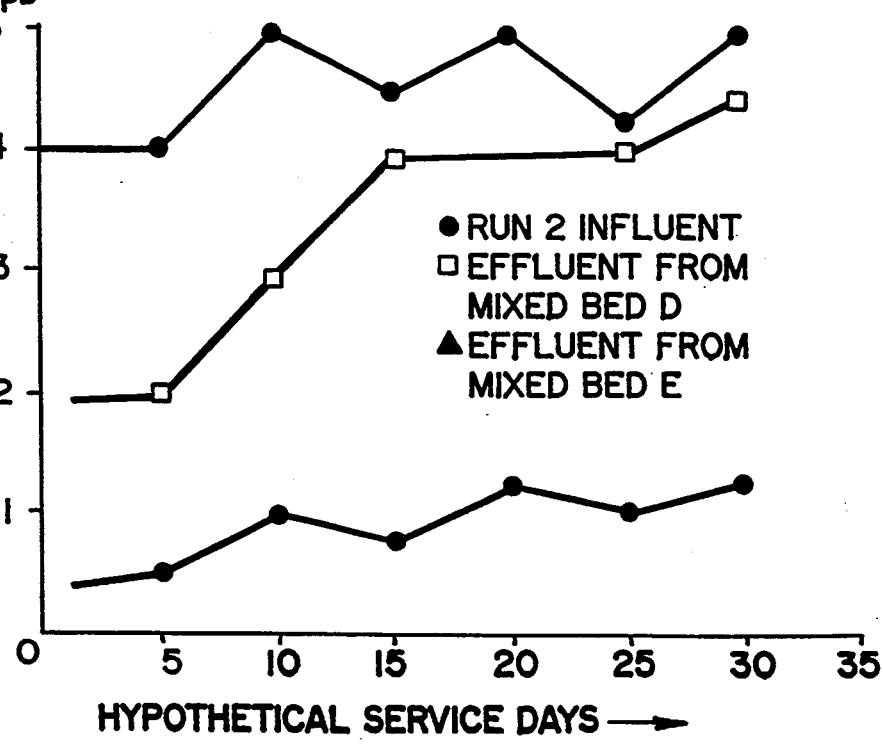
FIG. 7 is a graph which illustrates predicted test results for the filterable silica contents of the influent stream and the effluent streams of Run 2.

FIG. 7 presents the fictional concentrations of undissolved silica in the imaginary streams of Run 2. The concentration of filterable silica shown in FIG. 7 is the colloidal silica, both crystalline and amorphous, which is hypothetically retained by 0.45 micron paper filter. The filterable silica concentration of the effluent stream from Mixed Bed E, the conventional mixed bed, is expected to be virtually indistinguishable from that of the Run 2 influent stream after about 15 service days. In this scenario, the conventional mixed bed is not removing colloidal silica after that point. In contrast, the filterable silica concentration of the effluent stream from Mixed Bed E, of the present invention, is expected to remain unsaturated and to continue adsorbing colloidal silica throughout 30 service days.

It is hypothesized that the unique properties of the dual morphology anion exchange resin in Mixed Bed E are responsible for the difference in silica adsorption. The strongly basic anion exchange resin in Mixed Bed E in this imaginary scenario dissociates colloidal silica which becomes adsorbed at the surface of the anion exchange resin. Thereafter, the dissociated silica diffuses into the resin particles, clearing the surfaces of the particles for further silica adsorption. The dual morphology anion exchange resin dissociates and diffuses the silica at rates which are sufficiently high to significantly delay the onset of saturation for silica adsorption.

Figure 8:
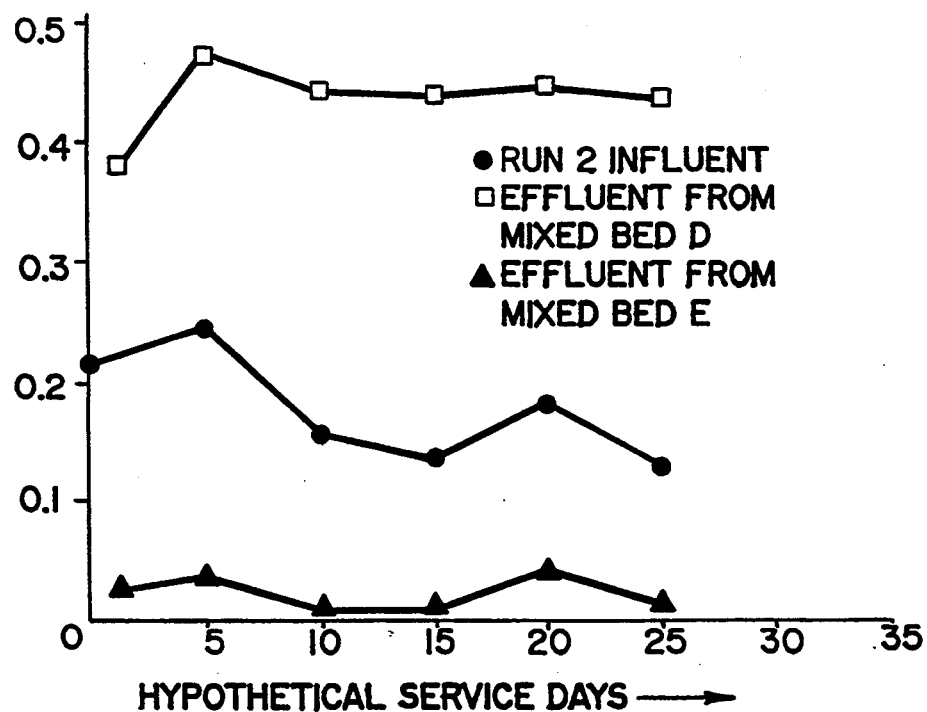
FIG. 8 is a graph which depicts predicted test results for the total organic carbon concentrations for the influent stream and the two effluent streams of Run 2.
Figure 9:
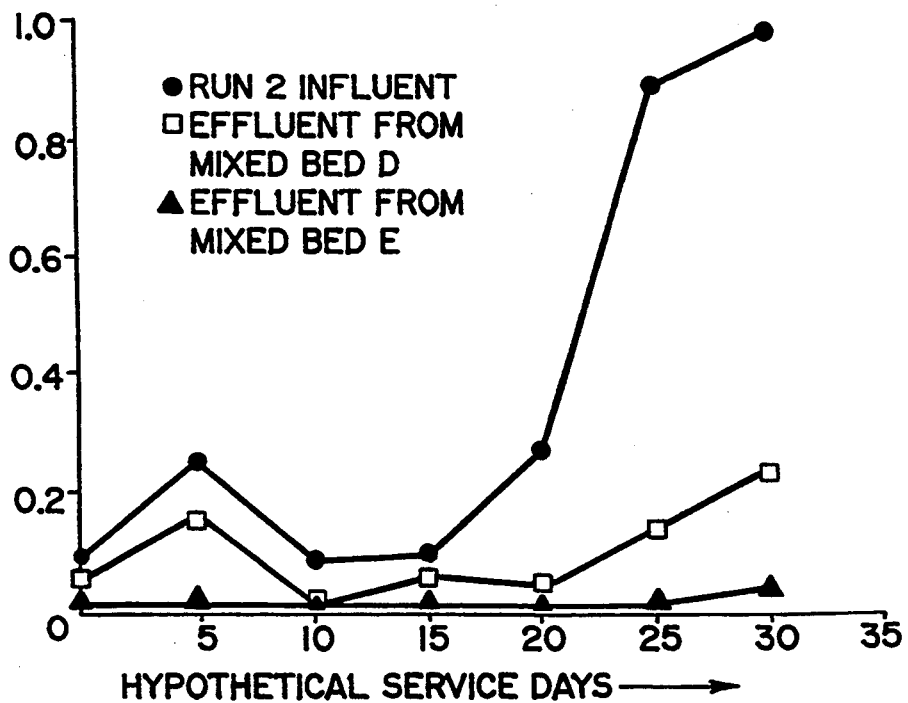
FIG. 9 is a graph which shows predicted test results for the sulfate concentrations of the influent stream and the two effluent streams of Run 2.

Turning to FIG. 8 and FIG. 9, samples from the three streams of Run 2 are postulated to be periodically analyzed for total organic content, and also by ion chromatography. The results of the two simultaneous analyses are assumed to be utilized together to calculate the concentration of organic and inorganic chlorides in the streams. Similarly, the concentrations of organic and inorganic sulfates are hypothesized to be determined by calculation.

The predicted total organic carbon content in weight parts per billion of the fictional three streams are presented in FIG. 8. A striking feature of FIG. 8 is that the concentration of total organic carbon material leaving Mixed Bed D is greater than the amount which arrives with the Run 2 influent stream. The hypothetical increase in total organic carbon concentration across conventional Mixed Bed E is due to a sloughage of sulfonic acids from the conventional cation exchange resin. Because the conventional anion exchange resin in Mixed Bed D is incapable of retaining the sulfonic acids that have been sloughed by the cation exchange resin, it is expected that the acids remain in the effluent stream from Mixed Bed D and are detected as organic carbon.

In contrast, FIG. 8 shows that the predicted concentration of total organic carbon leaving the mixed bed of the present invention, imaginary Mixed Bed E, is less than the concentration of total organic carbon entering Mixed Bed E with the Run 2 influent stream. The dual morphology anion exchange resin removes sulfonic acids sloughed from the cation exchange resin in Mixed Bed E. Consequently, the removal is detected as a significantly lower level of total organic carbon in the effluent from Mixed Bed E.

FIG. 9 graphically depicts predicted test results for the sulfate concentrations of the influent and effluent streams of Run 2. The sulfate concentration includes both organic and inorganic sulfates. As with total organic carbon, the sulfate concentration of the Mixed Bed D effluent stream is greater than that of the Run 2 influent stream. The increase is due to sulfate that is leached from the cation exchange resin of fictional Mixed Bed D.

Close inspection of FIG. 9 reveals that the imaginary conventional anion exchange resin of Mixed Bed D is able to retain some of the leached sulfate material during approximately the first 20 service days of Run 2. However, the conventional anion exchange resin eventually becomes saturated and allows relatively high sulfate levels to escape from Mixed Bed D in the effluent stream. In contrast, Mixed Bed E of this hypothetical scenario, which contains dual morphology anion exchange resin, removes sulfates leached from the conventional anion exchange resin with a higher efficiency and for a much longer time. FIG. 9 shows that the Mixed Bed E, of the present invention, is expected to continue to remove sulfates throughout 30 service days.

FIGS. 4 through 9, which represent useful fictions presented to illustrate prophetic Example 2, are intended to indicate the manner in which mixed beds of the present invention can provide longer service runs and effluent streams of higher purity when operated with the type of neutral or slightly acidic aqueous streams often encountered in Boiling Water Reactor condensate polishing.

EXAMPLE 3

Another prophetic example is provided to communicate the advantages of operating a mixed bed of the present invention for polishing condensate that is relatively alkaline, for example, condensate having a pH of more than about 8. Such condensates are often employed in pressurized water reactors and fossil fueled thermal electric plants where the alkalinity of the condensate is maintained by adding ammonia or amines, such as morpholine, to the condensate stream.

In the following prophetic example, fictional Mixed Bed D and Mixed Bed E, as described above in Example 2, are exposed to a synthetic condensate stream having a pH of about 9.6. The stream, designated Run 3 influent, is synthesized by adding morpholine to a high-resistivity water stream. In addition, objectionable contaminants are added to the Run 3 influent stream in amounts that are typical of condensates encountered in nuclear powered Pressurized Water Reactor operation. As in Example 2 above, the condensate streams are passed upflow through the mixed beds at a temperature of about 70° F. and a flux of 50 square feet per minute. Run 3 is a hypothetical 35 day period of such operation.

Approximately twelve hours of exposure to the Run 3 influent stream containing morpholine are expected to be sufficient to convert the conventional cation exchange resin of Mixed Bed D and of Mixed Bed E to morpholine form. That is, the counter-ions of the cation exchange resins included in the mixed beds are replaced by morpholinium cations. In morpholine form the surface of the cation exchange resin is only slightly acidic and is relatively ineffective for dissociating condensate contaminants, such as iron oxide and copper oxide, even when such contaminants are advantageously adsorbed on the surface of the cation exchange resin.

The alkalinity of the condensate is assumed to maintain most particulate condensate contaminants, for example, iron oxide particles, above their iso-electric points and keep both contaminant particles and the cation exchange resin negatively charged. As a result, contaminant particles are not expected to be adsorbed on the cation exchange resin surface in significant quantities. Contaminant particle removal, if any, is therefore estimated to take place predominantly on the anion exchange resin, which is positively charged and very alkaline on its surface.

Figure 10:
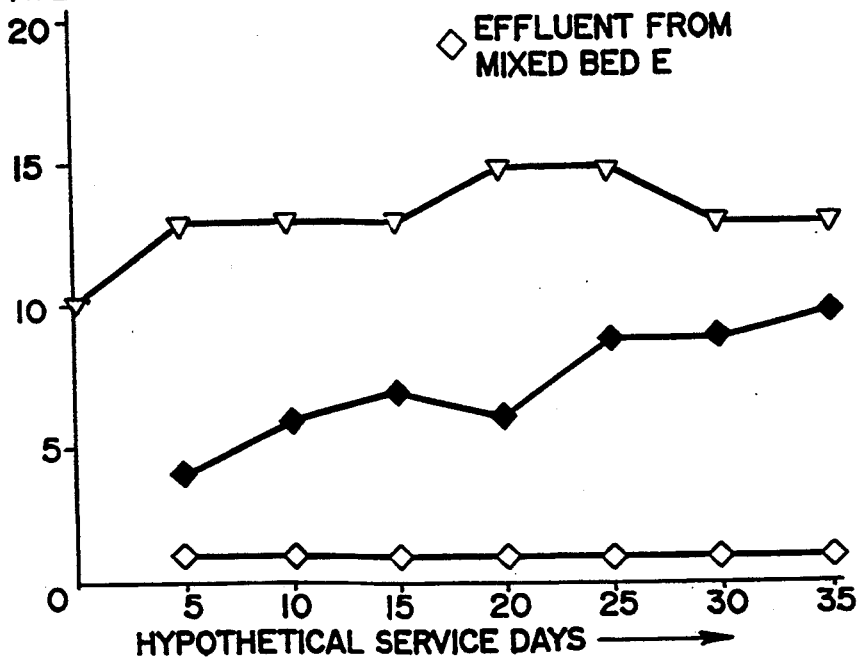
FIG. 10 is a graph which presents predicted test results for the metal oxide particulate concentrations of a Run 3 influent stream and two effluent streams as a function of service days.

FIG. 10 illustrates predicted test results for metal oxide particulate concentration of the imaginary Run 3 influent stream, and of associated fictional effluent streams from Mixed Bed D and Mixed Bed E, as a function of service days. Metal oxide particulate includes iron oxide particulate, copper oxide particulate, and aluminum oxide particulate. The metal oxide particulate concentration is supposedly determined by filtration, as described in Example 2.

The concentration of metal oxide particulate in the effluent stream from Mixed Bed E for Run 3 is postulated to be initially much less than that of the Run 3 influent stream. It is known that the conventional cation exchange resin removes very little metal oxide particulate when operating in an alkaline water stream. Therefore, the data in FIG. 10 indicates a hypothetical scenario in which the conventional anion exchange resin in Mixed Bed D adsorbs metal oxide particulate at the outset of Run 3. However, as Run 3 progresses the predicted removal rate of Mixed Bed D diminishes, consistent with the hypothesis that the conventional anion exchange resin reaches saturation relatively quickly.

In contrast, imaginary Mixed Bed E, which contains dual morphology anion exchange resin of the present invention, is expected to begin Run 3 at a relatively higher removal efficiency for metallic oxide particulate and continue at relatively high removal efficiency throughout Run 3. As the metallic oxide is adsorbed on the surface of the dual morphology anion exchange resin, the metallic oxide particulate dissociates and diffuses into the interior of the resin. Therefore, the surface of the dual morphology anion exchange resin in the hypothetical scenario does not become saturated and adsorption continues at a relatively high and stable rate throughout the 35 service day run.

Figure 11:
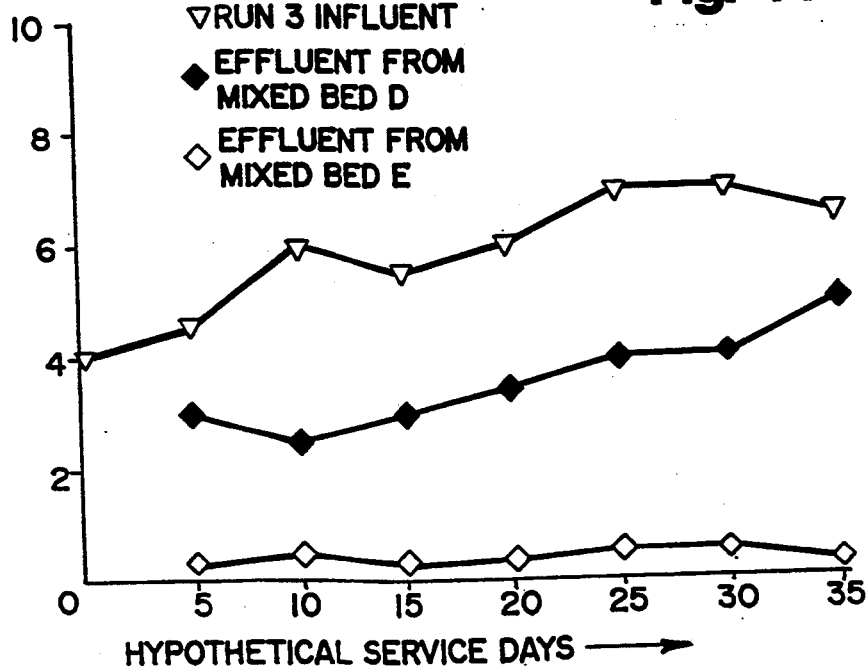
FIG. 11 is a graph which depicts predicted test results for the silica contents of the influent stream and the two effluent streams of Run 3.

FIG. 11 shows fictional concentrations of filterable silica for the alkaline Run 3 influent stream and effluent streams. The conventional mixed bed, Mixed Bed D, supposedly removes silica initially, but quickly becomes saturated. In contrast, the mixed bed of the present invention, Mixed Bed E, begins Run 3 with a relatively high adsorption efficiency for silica and continues to adsorb silica for a longer period. The predicted test results of FIG. 11 are consistent with the hypothesis that the dual morphology anion exchange resin adsorbs silica on its surface, and also dissociates and diffuses silica into the interior of the resin particle at rates which are sufficiently similar to sustain relatively prolonged silica removal.

Figure 12:
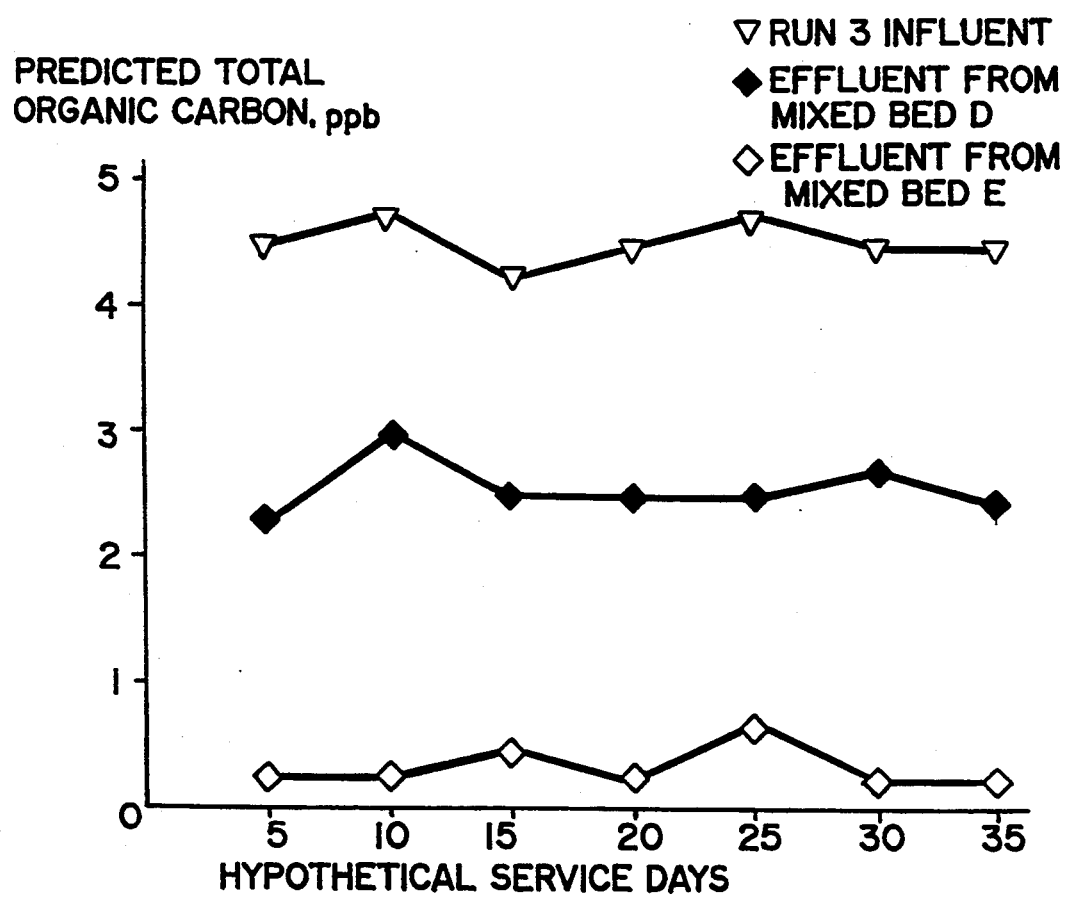
FIG. 12 is a graph which illustrates predicted test results for the total organic carbon concentrations of the influent stream and the two effluent streams of Run 3.

FIG. 12 shows predicted test results for total organic carbon concentrations for the hypothetical Run 3 streams. As in Example 2 above, the presence of higher total organic carbon concentration in the effluent stream from Mixed Bed D, as compared to the Run 3 influent stream, is intended to indicate that the conventional cation exchange resin is releasing sulfonic acid to the condensate stream. The conventional anion exchange resin does not remove the sulfonic acid, which exits with the effluent stream from Mixed Bed D. The sulfonic acid is detected as an increase in total organic carbon concentration for the Mixed Bed D effluent stream.

By way of comparison, the Run 3 effluent stream from Mixed Bed E of this imaginary situation exhibits less total organic carbon concentration than does the Run 3 influent stream at all times during the 35 service day period. Therefore, the data in FIG. 13 indicate the manner in which a mixed bed containing dual morphology anion exchange resin can provide relatively higher total organic carbon removal efficiency when operating in an alkaline, high-resistivity water stream.

Turning away from the Examples now, the invention also provides a method for selecting an ion exchange resin for removing metal oxides from condensate. The method for selecting is useful for choosing between different types of highly ionized ion exchange resin. The method identifies ion exchange resins which have an enhanced capacity for metal oxides and colloidal material. A resin which is selected using the method need only be additionally tested for hydraulic stability and for leaching of soluble polystyrene sulfonates, before the resin can be confidently recommended for large pilot plant scale testing. The method obviates the need for trial and error testing of a large number of resins on a pilot plant scale by significantly narrowing the field of resins for further testing. The properties of hydraulic stability and leaching of polystyrene sulfonates can be readily evaluated in the laboratory.

The method includes providing particles of a highly ionized ion exchange resin. "Particles" is a broad term intended to cover beads in the range of about 20 to about 40 mesh, granules in the range of about 60 to 200 mesh, and powders in the range of about 325 Tyler mesh or smaller. For more information concerning the Tyler mesh designation system, see Perry's Chemical Engineering Handbook, p. 21–15 (6th ed. 1984). Accordingly, the method can be used to screen resins for deep bed or prefilter precoat applications.

With the particles in a dry state, it is determined whether the particles are opaque or translucent. A dry state is a condition in which a resin contains 5% or less moisture content based on the dry weight of the resin. The determination is made with respect to light having wave lengths in the visible range. The determination is made after the particles have been pretreated to prepare for characterization, using the procedure described above.

The resin is determined to be opaque if substantially no visible light can pass through the particle. The particle is translucent or transparent if an appreciable amount of light is able to pass through solid particles. Preferably, this determination is accomplished by visually examining the particles. A microscope may be used as an aid in the visual examination.

The unique highly ionized styrene-divinylbenzene ion exchange resins having an enhanced capacity for the metal oxides and colloidal material present in high-resistivity aqueous streams can be described independently by two different criteria. One criteria is optical appearance and the other is a physico-chemical criteria.

The unique ion exchange resins are opaque in appearance when fully hydrated and translucent to transparent when desiccated. Additionally, the unique ion exchange resins are macroreticular when fully hydrated and microreticular when desiccated. The term macroreticular is synonymous with the term macroporous. The term microreticular is synonymous with the terms microporous and gel-type. For the purpose of this invention, the terms opaque, translucent and transparent are defined as follows:

Opaque—The opaque structure does not permit passage of ordinary light or permit ordinary objects to be seen through the opaque structure.

Translucent—The translucent structure permits passage of ordinary light but does not permit objects to be seen through the translucent structure.

Transparent—The transparent structure permits the passage of ordinary light and permits objects to be seen through the transparent structure.

The physico-chemical structure of the unique ion exchange resins may be defined by a combination of total moisture holding capacity and surface area. For the purpose of this invention, the limits consistent with the unique products having the enhanced capacity for the metal oxides are as follows:

Total Moisture Holding Capacity, % wt.—45 to 65%
Surface Area, $m^2/g$—7 to 60

The optical appearance of the ion exchange resin beads in the fully hydrated and desiccated states in vials may be observed visually in a strong light. The appearance of the ion exchange resin beads may also be observed microscopically at a magnification of about 20X using transmitted light. The beads, wet or dry, are placed on a glass slide with grid marks so as to observe the passage or non-passage of light and the observance or lack of observance of the grid marks through the beads.

The methods for the examination of the macroreticular and microreticular beads are described in the following references which are herein incorporated by reference:

1. AMBER-HI-LITES, No. 161, Spring, 1979. Publication of Rohm and Haas Company, Phila., Pa.
2. Kun, Ken and Kunin, R., J. Polym. Sci., Part A-1, Vol. 6, 2689 (1968).
3. Brunauer, S., Emmett, P., and Teller, E., J. Amer. Chem. Soc., 60, 309 (1938).

The term surface area or specific surface (square meters/gram) refers to the apparent surface of the boundary of the particle itself as well as the surface area of the accessible pores of the entire particle. Since the microreticular ion exchange resin beads have essentially no pore structure, the surface areas of these particles are low and depend upon particle size. Hence commercial microreticular ion exchange beads have surface areas less than 0.1 square meters/gram. Most macroreticular ion exchange beads of the same particle size have surface areas in the 5–200 square meters/gram range.

A similar determination is also made with the particles in a hydrated state. The hydrated state is one in which the particles contain about 95% or more of their fully hydrated moisture content. This determination is also preferably performed by visually examining the particles. Both the determining in the dry state and determining in the hydrated state are accomplished with the particles of resin in hydrogen form.

Dual morphology particles are defined as those which are translucent in a dry state and opaque in a hydrated state. The dual morphology particles are selected for use in removing iron oxides from condensate, where it is probable that they will exhibit enhanced metal oxide removal and colloidal material removal, as compared to highly ionized ion exchange resin particles which do not exhibit dual morphology. One need only perform laboratory scale tests for hydraulic stability and for possible leaching of soluble polystyrene sulfonates on dual morphology catalyst selected according to the present invention before proceeding to large pilot plant experimentation with the selected resins.

The method for selecting resins is a significant advance in the technology of metal oxide removal by ion exchange resins because the normal methods for measuring surface area are restricted to resins under completely dry and evacuated conditions. The results of this dry resin surface area testing can be misleading because many cation exchange resins lose surface area when they are dried.

Without wishing to be bound by theory, the following hypothesis is advanced as a tentative explanation of how the method for selecting resins is able to produce surprisingly useful results. Even though wet surface area and wet pore volume cannot be directly measured, it is likely that resins possessing both high surface area and a high pore volume in the hydrated state possess a relatively enhanced capacity for removing metal oxides and colloidal material from an aqueous stream. The problem lies in identifying the most suitable resins without resorting to large scale pilot plant test programs.

It is hypothesized that the method for selecting identifies resins which are essentially gelular in the desiccated state, as indicated by translucency to visual range light, but which have a sufficiently low degree of cross-linking to undergo significant swelling on contact with water. In theory, the resins selected are those which may swell to such an extent that pores having diameters much larger than the molecular scale are formed. The large pores having diameters greater than 30 Å may possibly interfere with the transmission of visible light through the resin and cause the hydrated resin to be opaque to visible range light.

The invention additionally provides a method of removing amorphous iron oxide from condensate. Earlier researchers have identified amorphous iron oxide as the most difficult form of iron oxide to remove from condensate. The amorphous iron oxide is not a simple ionic species. It is usually a colloid whose charge varies with process conditions. Under the conditions of BWR operation, the charge on the colloid iron oxide is positive and the iron oxide can be adsorbed by the cation exchange resin. As the crystalline and ionic forms of iron oxide compounds are relatively easy to remove, the most efficient methods of removing iron oxide are those which are effective with amorphous iron oxide.

In the method, amorphous iron oxide is adsorbed on a strong acid cation exchange resin. The resin includes a resin matrix which is defined as a molecular network of an ion exchange resin which carries fixed ions. The fixed ions are those non-exchangeable ions and ionogenic groups in ion exchanger resin which have a charge opposite to that of mobile exchangeable ions. The resin also includes an adsorbent surface which generally surrounds the resin matrix defining both an external boundary surface for the resin and an internal surface. The internal surface delineates relatively large pores which are not a part of the resin matrix gel structure. The amorphous iron oxide is adsorbed on the adsorbent surface to produce adsorbed iron oxide which is relatively immobile.

The adsorbed iron oxide is dissociated to iron-containing ions. Dissociation occurs at the adsorbent surface where active sites apparently create localized regions of pH which are below an iso-electric point for hydrous iron oxides. Adsorption and dissolution can only occur if active sites at the adsorbent surface are in hydrogen form, providing the necessary acidity to cause dissolution of the hydrous iron oxides.

After dissociating into iron-containing ions, the iron-containing ions at the adsorbent surface diffuse into the resin matrix, leaving the active sites at the adsorbent surface free to adsorb and dissociate more of the amorphous iron oxide. In order to keep the relative rates of adsorption, dissociation, and diffusion in balance, and so maximize the removal of amorphous iron oxide from condensate, it is necessary that the strong acid cation exchange resin employed be gelular in a dry state and substantially macroreticular in a hydrated state.

It is especially preferred that the strong acid cation exchange resin which is gelular in a dry state and substantially macroreticular in a hydrated state be a resin manufactured by Mitsubishi Kasei Corporation under the trade name PK 212L. The resin Diaion ™ PK212L is a sulfonic resin having a styrene-divinylbenzene cross-linked matrix. The resin is obtained in the sodium form and converted to the hydrogen form for use in the present invention.

The invention also provides a method of removing a metal oxide from condensate, such as silicon oxide (including silica), aluminum oxide (including alumina), or zinc oxide (including zinca). The metal oxide is adsorbed on the adsorbent surface of the strongly basic anion exchange resin. The adsorbent metal oxide is dissociated into ions which diffuse into resin. Preferably, the strongly basic anion resin is a dual morphology resin. It is especially preferred that the resin is Diaion ™ PK308 commercially available from the Mitsuibishi Kasei Corporation. Also, it is preferred that, the metal oxide is in the form of positively charged suspended colloidal particles in an alkaline stream, which become negatively charged under the influence of the anion resin and are then adsorbed.

The method of removing metal oxide may be applied utilizing a resin in a powdered form. Preferably, the powdered form resin has a size distribution such that in the range of about 90% or more of the resin can pass through a 325 mesh screen, according to the Tyler mesh system. The resin is applied as a layer on an upstream side of a filter through which a condensate stream is passed. The layer is preferably in the range of about one-eighth to about one-half of an inch thick, and typical flow rates through the filter are about 4 gallons per minute per square foot of filter surface.

Preferably, the resin is in a bead form having a Tyler mesh size in the range of about 20 to about 40. It is recommended that the resin in the bead form be arranged in a bed having a depth of about 20 to about 24 inches through which the condensate stream is passed.

It is necessary that the resin be gelular in a dry state and substantially macroreticular in a hydrated state. Otherwise, the adsorbing, dissociating, and diffusing steps would not remain in balance and the method would not continue to operate with an enhanced removal efficiency. It is contemplated that the resin will normally be in the dry state at the end of a process accomplishing manufacture of the resin and that the resin will be converted from a gelular morphology to a macroreticular morphology by contacting the resin with water at an industrial site shortly before commercial use.

Although particular embodiments of the present invention have been described for the purpose of clarity, it is not intended that the invention be limited to the described embodiments. The scope of the invention is intended to be as broad as the claims will allow. Further, although certain theories have been advanced as possible explanations for the surprising effectiveness of the present invention, the invention is not limited to and does not stand or fall with the theories. The invention, when practiced as described, represents a significant advance in the technology of metal oxide removal and colloidal material removal by ion exchange resins.

What is claimed is:

1. A method for removing colloidal silica from a high-resistivity aqueous stream, comprising:

hydrating a highly ionized dual morphology ion exchange resin having counter-ions in a microreticular, desiccated morphology to convert said dual morphology ion exchange resin to a macroreticular, hydrated morphology;

said dual morphology ion exchange resin being gelular in a dry state and substantially macroreticular in a hydrated state; and passing a relatively high-resistivity aqueous stream which has a concentration of colloidal silica into a separation zone that includes a particulate bed constituted by said dual morphology ion exchange resin in a macroreticular, hydrated morphology.

2. The method of claim 1 wherein said aqueous stream is passed into said separation zone while said dual morphology ion exchange resin is in a non-salt form in which said counter-ions are substantially composed of hydrogen ions or hydroxide ions.

3. The method of claim 1 wherein said aqueous stream is passed through said particulate bed, and said particulate bed is substantially composed of resin particles having a particle size in the range of about 250 microns to about 1200 microns.

4. The method of claim 2 which further comprises converting the dual morphology ion exchange resin from a salt form to said non-salt form with a simultaneous swelling of the dual morphology ion exchange resin in the range of about 5% to about 12% by volume.

5. The method of claim 4 wherein said swelling simultaneous with conversion to said non-salt form is in the range of about 5% to about 10% by volume.

6. The method of claim 1 wherein the hydrating of the dual morphology ion exchange resin increases the moisture content of said dual morphology ion exchange resin to the range of about 45% to about 65% by weight.

7. The method of claim 6 wherein the dry surface area of the dual morphology ion exchange resin is in the range of about 7 to about 60 square meters per gram.

8. A method for removing colloidal silica from a high-resistivity alkaline aqueous stream, which comprises:

hydrating a strongly basic dual morphology anion exchange resin in a microreticular, desiccated morphology to convert said dual morphology anion exchange resin to a macroreticular, hydrated morphology;

said dual morphology anion exchange resin being gelular in a dry state and substantially macroreticular in a hydrated state; and passing a relatively high-resistivity alkaline aqueous stream containing a first concentration of colloidal silica into a separation zone that includes a first particulate bed constituted by said dual morphology anion exchange resin in said macroreticular, hydrated morphology in a hydroxide form.

9. The method according to claim 8 which further comprises contacting the aqueous stream with a cation exchange resin in a hydrogen form.

10. The method of claim 9 wherein said cation exchange resin is a dual morphology cation exchange resin.

11. The method of claim 9 which further comprises contacting the aqueous stream with the dual morphology anion exchange resin and with the cation exchange resin at predetermined space velocities, in which the ratio of a dual morphology anion exchange resin space velocity to a cation exchange resin space velocity is in the range of about 9:1 to about 1:3.

12. The method of claim 9 which further comprises producing in the separation zone a relatively purified stream having a second concentration of said colloidal silica, reduced in comparison to said first concentration; and contacting the purified stream with a second particulate bed including an ion exchange resin.

13. The method of claim 9 wherein the aqueous stream is contacted with said dual morphology anion exchange resin and said cation exchange resin in the first particulate bed as a mixed bed process.

14. The method of claim 8 wherein the contacting of the aqueous stream with the dual morphology anion exchange resin is contacting between the aqueous stream and a multitude of resin particles, each of the resin particles having a particle size in the range of about 250 microns to about 1200 microns.

15. The method of claim 8 which further comprises converting the dual morphology anion exchange resin from a chloride form to the hydroxide form with a simultaneous swelling of the dual morphology anion exchange resin in the range of about 5% to about 10% by volume.

16. The method of claim 8 wherein the hydrating of the dual morphology anion exchange resin increases the moisture content of said dual morphology cation exchange resin to the range of about 45% to about 65% by weight.

17. The method of claim 16 wherein the dry surface area of the dual morphology anion exchange resin is in the range of about 7 to about 60 square meters per gram.

18. A method of removing colloidal silica from a high-resistivity aqueous stream, which comprises:

adsorbing colloidal silica on a strongly basic anion exchange resin having a resin matrix and an adsorbent surface surrounding the resin matrix to produce adsorbed colloidal silica, said resin being gelular in a dry state and substantially macroreticular in a hydrated state;

dissociating the adsorbed colloidal silica into ions at the adsorbent surface of the resin; and diffusing the ions into the resin matrix.

19. The method of claim 18 wherein the resin is constituted by resin particles having an effective diameter in the range of about 5 to about 300 microns and present as a layer on an upstream side of a filter element permeated by a condensate stream.

20. The method of claim 18 wherein the resin is in a bead form and constitutes a bed having a depth in the range of about 24 to about 48 inches through which the condensate stream is passed.

21. The method of claim 18 further comprising converting the resin to a macroreticular morphology by contacting the resin with water.

22. The method of claim 18 wherein the resin has a moisture content in the fully hydrated state in the range of about 45% to 70% by weight and a surface area in the dry state in the range of about 7 to about 60 square meters per gram.

23. The method of claim 18 wherein said colloidal silica is a positively charged particle which approaches the surface of said resin and becomes negatively charged before being adsorbed on said resin.

24. A method for removing an organic acid from a high-resistivity alkaline aqueous stream, which comprises:

hydrating a strongly basic dual morphology anion exchange resin in a microreticular, desiccated morphology to convert said dual morphology anion exchange resin to a macroreticular, hydrated morphology;

said dual morphology anion exchange resin being gelular in a dry state and substantially macroreticular in a hydrated state; and passing a relatively high-resistivity alkaline aqueous stream containing a first concentration of an organic acid into a separation zone that includes a first particulate bed constituted by said dual morphology anion exchange resin in said macroreticular, hydrated morphology in a hydroxide form.

25. The method according to claim 24 which further comprises contacting the aqueous stream with a cation exchange resin in a hydrogen form.

26. The method of claim 25 wherein said cation exchange resin is a dual morphology cation exchange resin.

27. The method of claim 25 which further comprises contacting the aqueous stream with the dual morphology anion exchange resin and with the cation exchange resin at predetermined space velocities, in which the ratio of a dual morphology anion exchange resin space velocity to a cation exchange resin space velocity is in the range of about 9:1 to about 1:3.

28. The method of claim 25 which further comprises producing in the separation zone a relatively purified stream having a second concentration of said organic acid reduced in comparison to said first concentration; and contacting the purified stream with a second particulate bed including an ion exchange resin.

29. The method of claim 25 wherein the aqueous stream is contacted with said dual morphology anion exchange resin and said cation exchange resin in the first particulate bed as a mixed bed process.

30. The method of claim 25 wherein the contacting of the aqueous stream with the dual morphology anion exchange resin is contacting between the aqueous stream and a multitude of resin particles, each of the resin particles having a particle size in the range of about 250 microns to about 1200 microns.

31. The method of claim 25 which further comprises converting the dual morphology anion exchange resin from a chloride form to the hydroxide form with a simultaneous swelling of the dual morphology anion exchange resin in the range of about 5% to about 10% by volume.

32. The method of claim 25 wherein the hydrating of the dual morphology anion exchange resin increases the moisture content of said dual morphology cation exchange resin to the range of about 45% to about 70% by weight.

33. The method of claim 32 wherein the dry surface area of the dual morphology anion exchange resin is in the range of about 7 to about 60 square meters per gram.

34. The method of claim 24 wherein the organic acid is a sulfonic acid.

* * * * *